(12) United States Patent
Wilson

(10) Patent No.: US 9,897,254 B2
(45) Date of Patent: Feb. 20, 2018

(54) HELICOPTER DRIP PAN

(71) Applicant: Phoenix Products, Inc., McKee, KY (US)

(72) Inventor: Thomas Gray Wilson, McKee, KY (US)

(73) Assignee: Phoenix Products, Inc., McKee, KY (US)

( * ) Notice: Subject to any disclaimer, the term of this patent is extended or adjusted under 35 U.S.C. 154(b) by 0 days.

(21) Appl. No.: 15/269,626

(22) Filed: Sep. 19, 2016

(65) Prior Publication Data

US 2017/0067599 A1    Mar. 9, 2017

Related U.S. Application Data

(62) Division of application No. 13/839,551, filed on Mar. 15, 2013, now Pat. No. 9,447,920.

(51) Int. Cl.
*B64C 27/04* (2006.01)
*F16N 31/00* (2006.01)
(Continued)

(52) U.S. Cl.
CPC ............ *F16N 31/006* (2013.01); *B64C 27/04* (2013.01); *B64D 27/00* (2013.01); *B64D 47/00* (2013.01);
(Continued)

(58) Field of Classification Search
CPC ........ F01M 11/0004; F01M 2011/0058; F16N 31/006; F16N 2210/08; B64C 27/04

USPC ......... 184/17.21, 17.23, 60, 806; 244/17.11, 244/17.21, 17.23, 60, 99.3; 220/326, 806, 220/378; 277/598
See application file for complete search history.

(56) References Cited

U.S. PATENT DOCUMENTS 2,053,297 A  *  9/1936  Nittel ................. F01M 11/0004
                                                              180/69.1
2,383,200 A  *  8/1945  Kramer ................. B64C 1/1446
                                                              131/195
(Continued)

OTHER PUBLICATIONS

International Search Report and Written Opinion issued in International Application No. PCT/US2008/086807; dated Apr. 14, 2009; 12 pages; European Patent Office.
(Continued)

*Primary Examiner* — Benjamin P Lee
(74) *Attorney, Agent, or Firm* — Wood Herron & Evans LLP

(57) ABSTRACT

A drip pan apparatus for use in a helicopter includes a drip pan and a frame having a plurality of frame sides and a plurality of frame corners that define an inwardly-facing peripheral surface. A first frame angle is formed between a first inwardly-facing surface and a second inwardly-facing surface. The first frame angle is an acute angle. The drip pan has an outwardly-facing peripheral surface. The outwardly-facing peripheral surface defines a plurality of sides, including a first side and a second side, to cooperate with the inwardly-facing peripheral surface of the frame. A first angle is formed between the first side and the second side. The first angle is an acute angle. A method of installing a drip pan includes modifying at least a portion of a skirt on the helicopter and then securing the frame to one or both of the modified skirt and the helicopter structure.

9 Claims, 13 Drawing Sheets

(51) Int. Cl.
   *B64D 47/00*   (2006.01)
   *B64D 27/00*   (2006.01)

(52) U.S. Cl.
   CPC ........ *F16N 31/002* (2013.01); *F16N 2210/08*
       (2013.01); *Y10T 29/49826* (2015.01)

(56) References Cited

U.S. PATENT DOCUMENTS

| | | | | |
|---|---|---|---|---|
| 2,475,836 | A * | 7/1949 | Henricksen | F02B 77/00 184/106 |
| 3,779,330 | A * | 12/1973 | Longpre | B62D 55/0845 180/69.1 |
| 3,971,511 | A * | 7/1976 | Casey | B60H 1/18 165/52 |
| 4,394,853 | A * | 7/1983 | Lopez-Crevillen | F01M 11/0004 123/195 C |
| 4,682,672 | A * | 7/1987 | Berger | F01M 11/0004 123/195 C |
| 4,936,483 | A * | 6/1990 | Ballu | F16J 13/24 220/240 |
| 5,018,407 | A * | 5/1991 | Hoecht | F16H 57/0421 184/109 |
| 5,067,530 | A * | 11/1991 | Short, III | F16N 31/002 141/98 |
| 5,411,116 | A * | 5/1995 | Kish | B64C 27/12 184/11.2 |
| 5,421,474 | A * | 6/1995 | Ramillon | F16B 21/18 137/584 |
| 5,531,196 | A * | 7/1996 | Clark | F01M 11/0004 123/195 C |
| 5,544,632 | A * | 8/1996 | Choate | F01M 11/0004 123/195 C |
| 6,112,856 | A * | 9/2000 | Wilson | F16N 31/002 184/106 |
| 6,216,823 | B1 | 4/2001 | Wilson | |
| D444,443 | S * | 7/2001 | Wilson | D12/317 |
| 6,446,907 | B1 * | 9/2002 | Wilson | F16N 31/002 184/106 |
| 6,729,576 | B2 * | 5/2004 | Kay | B64C 1/06 244/17.11 |
| 7,753,379 | B2 * | 7/2010 | Galpin | F16J 15/062 277/598 |
| 8,096,496 | B2 * | 1/2012 | Wilson | F16N 31/002 184/106 |
| 8,317,127 | B2 | 11/2012 | Wilson | |
| 9,447,920 | B2 | 9/2016 | Wilson | |
| 2006/0037427 | A1 * | 2/2006 | Holub | F16H 57/0408 74/606 R |
| 2008/0128430 | A1 * | 6/2008 | Kovach | B64D 37/06 220/586 |
| 2009/0159739 | A1 * | 6/2009 | Wilson | F16N 31/002 244/17.11 |
| 2012/0312914 | A1 * | 12/2012 | Wilson | B64C 27/12 244/17.11 |

OTHER PUBLICATIONS

Taiwanese Intellectual Property Office; Office Action issued in Taiwanese Patent Application No. 097149919; dated Jun. 13, 2012; 6 pages.

* cited by examiner

HELICOPTER DRIP PAN

CROSS REFERENCE TO RELATED APPLICATIONS

This application is a divisional of U.S. application Ser. No. 13/839,551 filed Mar. 15, 2013; which is related to U.S. Pat. No. 8,317,127 filed Jan. 10, 2012; U.S. Pat. No. 8,096,496 filed Dec. 8, 2008; and U.S. application Ser. No. 13/492,385, filed on Jun. 8, 2012, each of which is incorporated by reference herein in its entirety.

FIELD OF THE INVENTION

This invention relates to a fluid-tight drip pan, and more specifically to a fluid-tight drip pan for the engine or transmission compartment of a helicopter.

BACKGROUND OF THE INVENTION

Larger helicopters, in general, have several features in common in a typical basic configuration or layout. For instance, a typical helicopter will have a cabin section rearward of the pilot's cockpit or flight deck and which is used to transport people, cargo or both. In addition, the helicopter will have an engine compartment which is located typically above and to the rear of the pilot's cockpit or flight deck, and above the cabin section. The engine compartment typically houses two primary components, at least one engine and a rotor transmission with a corresponding transmission housing.

Both the engine and the rotor transmission contain numerous fluids, such as petroleum-based lubricants, that are critical to the operation of the engine and the transmission. These fluids inevitably leak from various locations in the engine and the transmission during both the operation and storage of the helicopter. Because the engine compartment is generally oriented above the cabin section, any leaking fluids eventually seep or drip into the cabin section, unless proper sealing mechanisms are in place. The inflow of these leaking fluids spoil, stain or damage the cabin's interior materials such as seat covers and acoustic linings. In addition, the leaking fluids can severely damage or destroy sensitive electronic equipment that may be placed in the cabin section of a helicopter.

Moreover, the exterior of the helicopter around the engine and transmission compartment is not completely fluidtight, allowing fluid such as water to leak from these areas into the cabin with similar adverse effects.

During routine inspection and maintenance it is necessary to have both ready visual and physical access to portions of the engine or at least the rotor transmission. Such access is required to check critical fluid levels, to replace worn, damaged or depleted parts or filters, or to adjust mechanical systems. Typically, various access panels in or around the engine or transmission compartments provide the requisite openings to achieve ready access to the engine and the rotor transmission. In some helicopters, a forged or fixed airframe structure forms an access opening which is located below the rotor transmission housing and above the cabin section. The opening is thus accessible through the cabin's ceiling. This access opening, however, must be sealed by a cover against the inevitable oil and fluid drippings which the engine and the rotor transmission will produce, as well as against water leakage.

The access opening below the engine compartment in prior helicopters, such as the BLACK HAWK® helicopter, made for the United States by Sikorsky Aircraft Company of Stratford, Conn., is defined by both the aircraft structural forgings and a flexible or yieldable downwardly-turned skirt which is riveted onto the helicopter's forged structure. The skirt is thin and many times more flexible relative to the helicopter's forged structure.

Prior drip pan designs attached a covering plate directly to the flexible skirt with a hollow seal sandwiched therebetween. One hollow seal used in prior designs resembled the flexible, hollow door seals used around car doors or refrigerator doors. However, the skirt contains surface aberrations, such as the protruding rivet heads from the rivets securing the skirt to the forged helicopter structure. When the seal engaged both the skirt and the rivet heads, it could be upset enough so that leakage occurred. Accordingly, the hollow seal traversing these aberrations while sandwiched between the skirt and the covering plate is unable to provide a suitable, consistent, long-term fluid seal. Moreover, flexing of the flexible skirt could also cause leakage.

Also, the geometry of the cover cannot be such that it protrudes significantly into the interior of the cabin section. Headroom in the cabin section typically is limited and any additional protrusion from the ceiling of the cabin section is undesirable. In addition, because weight is critical to the operation of any aircraft, heavy cover constructions are undesirable.

Other prior drip pan structures disclosed in U.S. Pat. Nos. 6,112,856; 6,216,823; and 6,446,907 and Design Pat. No. D444,443, which are fully incorporated herein by this express reference, provided improvements and solutions to these difficulties.

In addition, Sikorsky more recently introduced its "M" Model BLACK HAWK® helicopter for which these prior structures were not readily adaptable due to a change in configuration of the skirt noted above. In particular, while the prior drip pans provided a port for visual access to an oil filter, the port was offset from the filter, rendering it more difficult to see the filter from many viewing angles through the port, requiring specially shaped tools to manipulate filter retention bolts, and requiring tilting of filters when removed or replaced.

The "M" model was introduced by Sikorsky for use by U.S. Military. In that model, and in other aircraft with what are or will be similarly-shaped skirts, there is a skirt as disclosed in U.S. Pat. No. 8,096,496 with an access area or corner for the filter which is pulled outwardly to allow direct and straight-through access to the filter and its filter retention bolts when the pan is removed. Such direct access is preferable as it eliminates the need for the special dog-bone shaped tools necessary to operate the filter retention bolts to remove and install the filter as was required with the prior drip pan, which not only required such tools but also required the filter to be "tipped" as it was removed or replaced and before it could be seated (see FIG. 6 of U.S. Pat. No. 6,446,907). Accordingly, in the new "M" model, one corner has been pulled or extended outwardly and asymmetrically to the other corners. Stated in another way, the radius point or center of the expanded corner curve of the skirt has been moved outwardly from its position in the prior drip pan and the straight sides of the skirt are no longer tangent to the curve of this corner.

The problems associated with the asymmetrical nature of the skirt, which takes on inwardly-facing convex shapes, directed inwardly of the access opening, before flowing into an expanded inwardly-facing concave corner in the "M" model were overcome by a drip pan apparatus disclosed in U.S. Pat. Nos. 8,096,496 and 8,317,127 while still forming a leak-proof seal of the access opening in spite of the previously experienced difficulties with forming a face seal in this location. Furthermore, the drip pan apparatus disclosed is cost effective and easily installed while also facilitating maintenance of the rotor transmission and particularly easing access to the filter secured to the rotor transmission. Moreover, the visual access to the filter through the corresponding site port was also solved.

Nevertheless, despite the significant improvement provided by the drip pan apparatus, modifications to the rotor transmission of the BLACK HAWK® helicopter, including model variations thereof, may slightly alter the position of the filter on the transmission. For example, the rotor transmission found in the S70A-09 helicopter, made for the Australian Army by Sikorsky is modified for applications specific the Australian Army's use. It is believed these slight modifications to the rotor transmission include a slight decrease in clearance between the oil filter and the skirt encircling the access opening for the rotor transmission. While the decrease in clearance is small, possibly amounting to an inch or less, access to the oil filter is hampered, even in situations in which the drip pan apparatus disclosed in U.S. Pat. No. 8,096,496 is utilized. Thus, there is a need for an improved drip pan apparatus for sealing the access opening of a rotor transmission in a helicopter, such as the S70A-09 Australian Army helicopter that utilizes the asymmetrical skirt found in the "M" Model BLACK HAWK® helicopter, that facilitates visual inspection of the rotor transmission, including inspection of the oil filter, and that facilitates and reduces maintenance time, while also sealing the access opening from leakage.

Accordingly, it is one objective to provide an improved leak-proof drip pan apparatus for use in an "M" model BLACK HAWK® helicopter or another helicopter, such as the Australian Army's S70A-09 helicopter, which shares a similar configuration of the skirt surrounding the access opening to the rotor transmission.

A further objective of this invention is to provide an improved cover and seal for the interior access opening of helicopters such as the BLACK HAWK® "M" model helicopter and those of similar structure, such as the Australian Army's S70A-09 helicopter.

Another object of this invention is to provide a drip pan that will effectively and consistently seal fluid from passage from an engine or transmission compartment to a cabin section of a BLACK HAWK® "M" model helicopter and similar air frames, such as the Australian Army's S70A-09 helicopter.

Another object of this invention is to provide a drip pan which permits quick visual and physical access to the engine or transmission compartment of a BLACK HAWK® "M" model helicopter and similar helicopters, such as the Australian Army's S70A-09 helicopter, without requiring modification to the existing aircraft structure.

Another objective of the invention is to more effectively seal a drip pan to the skirt defining a transmission access opening in a BLACK HAWK® "M" model helicopter and similar helicopters, such as the Australian Army's S70A-09 helicopter.

Still another object of this invention is to provide a drip pan that can be attached to the existing structure of a BLACK HAWK® "M" model helicopter and similar helicopters, such as the Australian Army's S70A-09 helicopter, with only slight modifications of the existing air frame structure and with minimal intrusion into the helicopter's cabin section.

Another objective of the invention is to provide an improved drip pan for use with a BLACK HAWK® "M" model helicopter and similar air frames, such as the Australian Army's S70A-09 helicopter, using an o-ring seal between drip pan and frame, where all peripheral curves in the pan are convex (i.e., outwardly directed) with respect to the pan.

Yet another objective of the invention is to provide enhanced visual access to a filter in an "M" model BLACK HAWK® helicopter and similar air frames, such as the Australian Army's S70A-09 helicopter.

SUMMARY OF THE INVENTION

In other features and functions, the new helicopter drip pan apparatus herein covers and effectively seals a structural opening in the helicopter without leakage.

To these ends, in one embodiment, there is provided a drip pan for cooperation with a frame secured to a depending skirt on a helicopter, an oil filter being attached to the rotor transmission, the frame having an inwardly-facing peripheral surface. The drip pan comprises a substantially planar member defining an access port and having an outwardly-facing peripheral surface. The access port permits access to the oil filter. The outwardly-facing peripheral surface defines a plurality of sides, including a first side and a second side, and is configured to cooperate with the inwardly-facing peripheral surface of the frame. A first angle is formed between the first side and the second side. The first angle is an acute angle.

In one embodiment, a second angle is formed between the second side and a third side of the plurality of sides. The second angle is an obtuse angle.

In one embodiment, a third angle is formed between a third side and a fourth side of the plurality of sides, the third angle being a right angle. The substantially planar member is adapted to be removably received within the frame in a single orientation.

In one embodiment, a fourth angle is formed between the first side and a fourth side of the plurality of sides. The fourth angle is an obtuse angle.

In one embodiment, neither of the first side and the second side is parallel to another side of the plurality of sides.

In one embodiment, a drip pan apparatus for use in a helicopter having an air frame and an access opening defined by a depending skirt attached to the air frame comprises a frame including a plurality of frame sides and a plurality of frame corners that define an inwardly-facing peripheral surface including a plurality of inwardly-facing surfaces corresponding to the plurality of frame sides and a plurality of inwardly-facing corner surfaces corresponding to the plurality of frame corners. A first frame angle is formed between a first inwardly-facing surface and a second inwardly-facing surface. The first frame angle is an acute angle.

In one embodiment, the frame further defines a plurality of holes. Each hole is configured to receive a fastener so as to secure the frame to one or both of the air frame and the skirt. The holes are spaced apart along a first straight line on a first frame side that defines the first inwardly-facing surface. The first straight line is not parallel with the first inwardly-facing surface.

In one embodiment, the holes are spaced along a second straight line on a second frame side that defines the second inwardly-facing surface. The second straight line is not parallel with the second inwardly-facing surface.

In one embodiment, the first straight line is substantially perpendicular to the second straight line.

In one embodiment, the drip pan apparatus further comprises a drip pan for sealing cooperation with the frame.

In one embodiment, the drip pan apparatus is for covering an oil filter having a longitudinal axis and the drip pan defines an access port at a first pan corner. The access port is orientated in a position to permit visual viewing of the oil filter through the access port.

According to one aspect of the present invention, there is provided a method of installing a drip pan apparatus to a helicopter structure where the helicopter has a rotor transmission and a depending skirt that defines a rotor transmission access opening. The drip pan apparatus comprises a frame having an inwardly-facing peripheral surface and a slot, a drip pan having an outwardly-facing peripheral surface, a resilient member attached to the drip pan and adapted to cooperate with the slot, and a seal member configured to be disposed between the inwardly-facing peripheral surface and the outwardly-facing peripheral surface. The method comprises modifying at least a portion of the skirt and then securing the frame to one or both of the modified skirt and the helicopter structure whereby at least a portion of the inwardly-facing peripheral surface is spaced outwardly from the modified skirt. The method further comprises inserting the drip pan into the frame such that seal member sealingly engages the inwardly-facing peripheral surface and the outwardly-facing peripheral surface against fluid leakage therethrough. The method further comprises engaging the slot with the resilient member to detachably secure the drip pan in sealing engagement with the frame.

These and other objectives and advantages will become readily apparent from the following description of embodiments of the invention and from the drawings in which:

PRIOR ART

Applicant first describes the prior art as in U.S. Pat. No. 8,096,496 (the '496 patent) for purposes of environment background and contrast with the embodiments of the present invention. Item numbers shown in FIGS. 2-5 when used on FIGS. 6A-12B designate components in FIGS. 6A-12B that are similar or identical to components in FIGS. 2-5.

Figure 1:
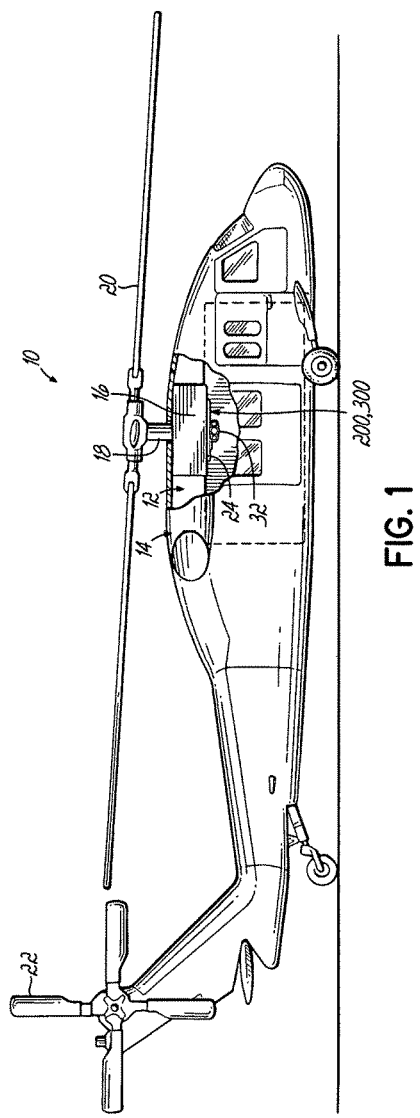
FIG. 1 is an elevation view of a helicopter according to one embodiment of the present invention.

FIG. 1 shows a widely known configuration of a helicopter 10. While the helicopter 10 in the '496 patent description was a BLACK HAWK® "M" model helicopter as manufactured for the U.S. by Sikorsky Aircraft Company, Stratford, Conn., it will be appreciated that the drip pan structure described in the prior patent was useful in numerous aircraft and helicopter configurations of other prior makes and models. It is known that the helicopter 10, such as the BLACK HAWK® "M" model, has a cabin 12 (dashed outline) in which passengers, equipment and cargo can ride during operation. Located just above the cabin 12 is at least one engine 14 which supplies power to a rotor transmission 16. The rotor transmission 16 is connected to a shaft 18 which imparts rotary motion to the main rotor 20. The rotor transmission 16 is also connected via a drive shaft (not shown) to a tail rotor 22.

Figure 2:
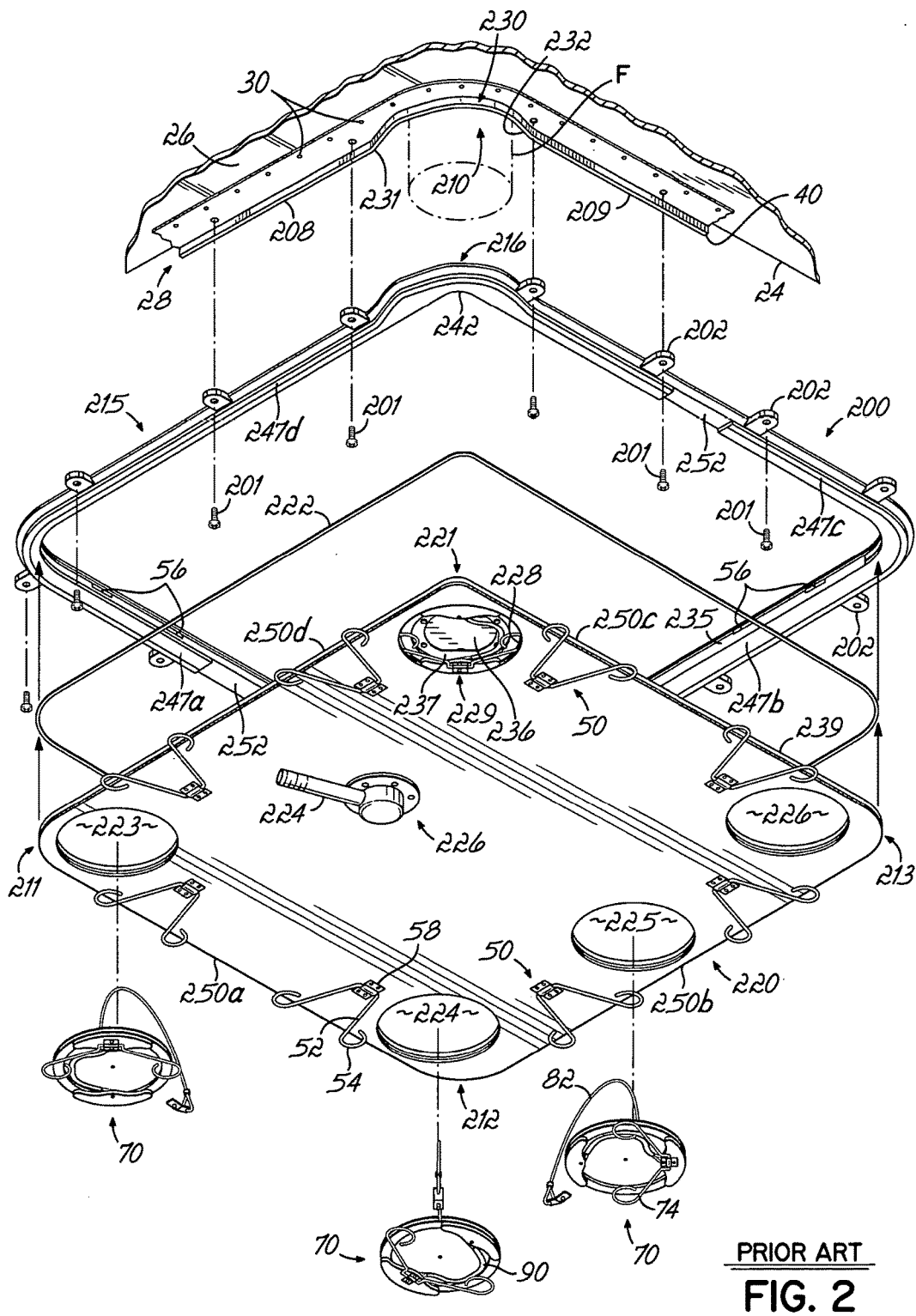
FIGS. 2-5 are reproduced herein from the prior U.S. Pat. No. 8,096,496 for clarity of contrast to the present invention and are described in that patent.

The rotor transmission 16 requires frequent inspection and maintenance to ensure proper operation of the transmission 16. To facilitate easy and ready access to the rotor transmission 16, rotor transmission access openings are provided on both the exterior and interior of the helicopter 10. For example, a structural opening 24 is located within the cabin 12 and provides the requisite access to the rotor transmission 16 situated directly above the cabin 12. With reference to FIGS. 1 and 2, the structural opening 24 is generally defined by an air frame member 26. A flexible skirt 28 is fixedly secured around the periphery of structural opening 24 by rivets 30. The flexible skirt 28 is many times more flexible than the air frame member 26 to which the skirt 28 is attached.

As can be further appreciated, the rotor transmission 16, as well as the engine 14, require various fluids during their respective operations. Generally, these fluids provide the rotor transmission 16 and the engine 14 with lubrication, cooling, and the like. During operation these fluids may leak and drip from either the engine 14 or the rotor transmission 16 or both. To prevent leakage of fluid into the cabin 12 via structural opening 24, a drip pan apparatus 200, as shown in FIG. 2, may be used to cover and seal the structural opening 24.

With specific reference to FIGS. 2-5, the prior drip pan apparatus 200 may be used in a BLACK HAWK® "M" Model helicopter and other similar air frames having the structural opening 24 defined by the air frame 26 and the flexible depending skirt 28 attached thereto. The flexible skirt 28 of the BLACK HAWK® "M" Model helicopter has a generally J-shaped cross-section and is attached to the air frame 26 so that one portion 40 of the J-shaped cross section generally extends perpendicularly from the air frame 26 or away from the transmission 16. The flexible skirt 28 includes two straight portions 208, 209 and an expanded corner 210 therebetween, as well as a remaining periphery defined by straight sections and corners (not shown in FIG. 2). Note that flexible skirt 28, between straight portions 208, 209, forms two inwardly-facing convex curves 231, 232 and an inwardly-facing concave curve 230. The concave curve 230 is oriented inwardly at the corner 210 so that straight portions 208, 209 flow into the curves 231, 232 which are tangent to, or flow into, curve 230. It will be appreciated that an extension of each straight portion 208, 209 would intersect an extension of curve 230 at an angle greater than zero degrees.

In view of the above, the corner 210 may generally be described as asymmetric to the other corners (not shown) of the flexible skirt 28, which other corners are generally similar to one another and each has a defined radius. In other words, the corner 210 is defined by a shape that is different than the other corners of the flexible skirt 28. The flexible skirt 28 thus may have one asymmetric corner at 210 with the remaining corners being generally symmetrical with one another. Nevertheless, the drip pan apparatus 200 sealingly cooperates with the flexible skirt 28, including the corner 210, at the structural opening 24 to prevent fluid drippings from entering the cabin 12 of the BLACK HAWK® "M" Model helicopter 10 and similar helicopters structures.

To that end, and with continued reference to FIG. 2, the drip pan apparatus 200 includes a frame 215 having a corner structure 216, a drip pan 220 having a corner 221, and an o-ring seal 222. In use, the frame 215 is secured to air frame 26. As shown, rivets 201 or other fasteners may secure the frame 215 to the flexible skirt 28 and air frame member 26 through tabs 202. A flexible sealing media (not shown), such as PROSEAL™ (manufactured by PRC Desoto International, Inc. of Indianapolis, Ind., a PPG Company) or other sealant may be used to seal the frame 215 to flexible skirt 28 when the frame 215 is secured to the air frame 26.

Figure 3:
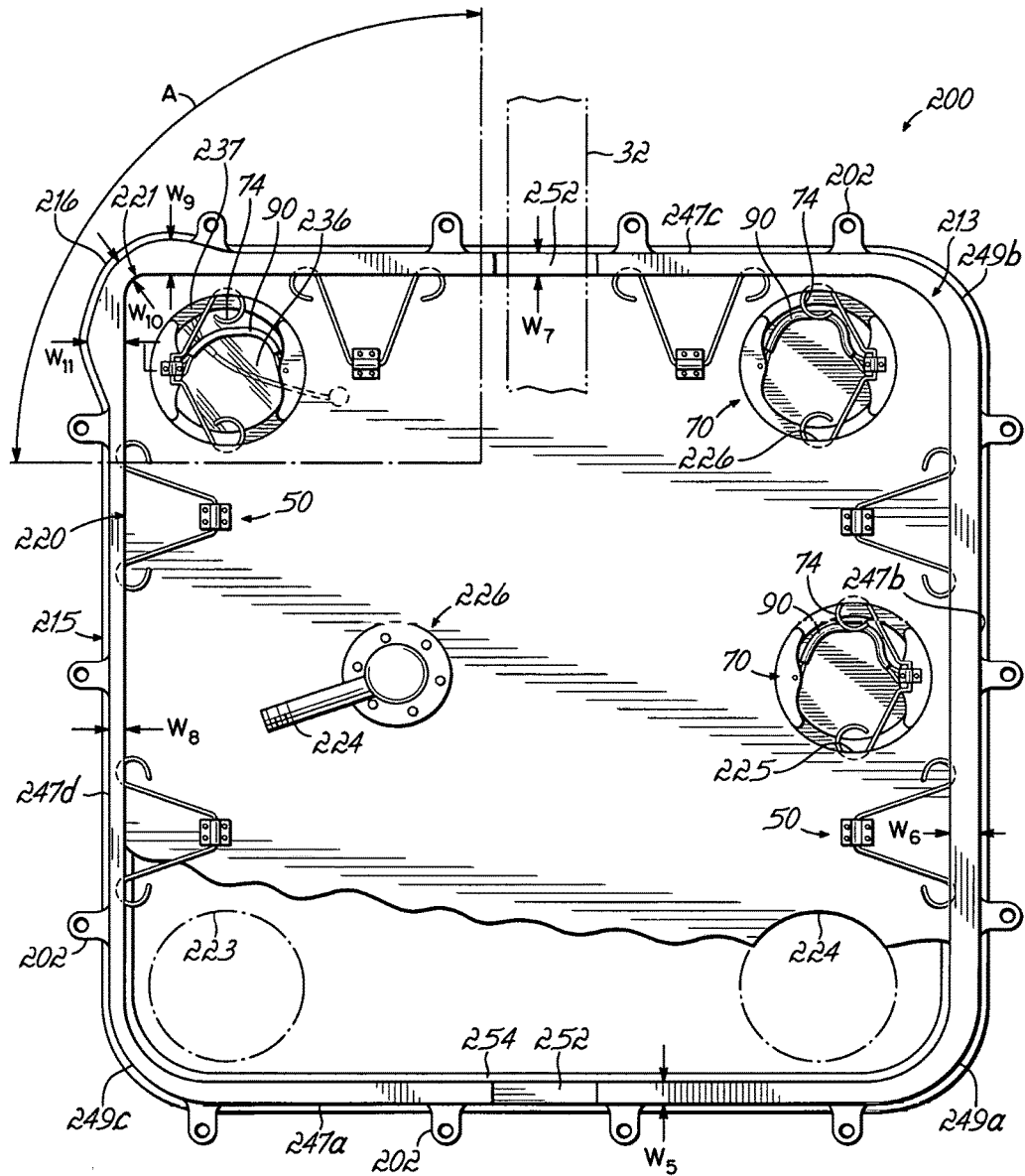
Figure 4:
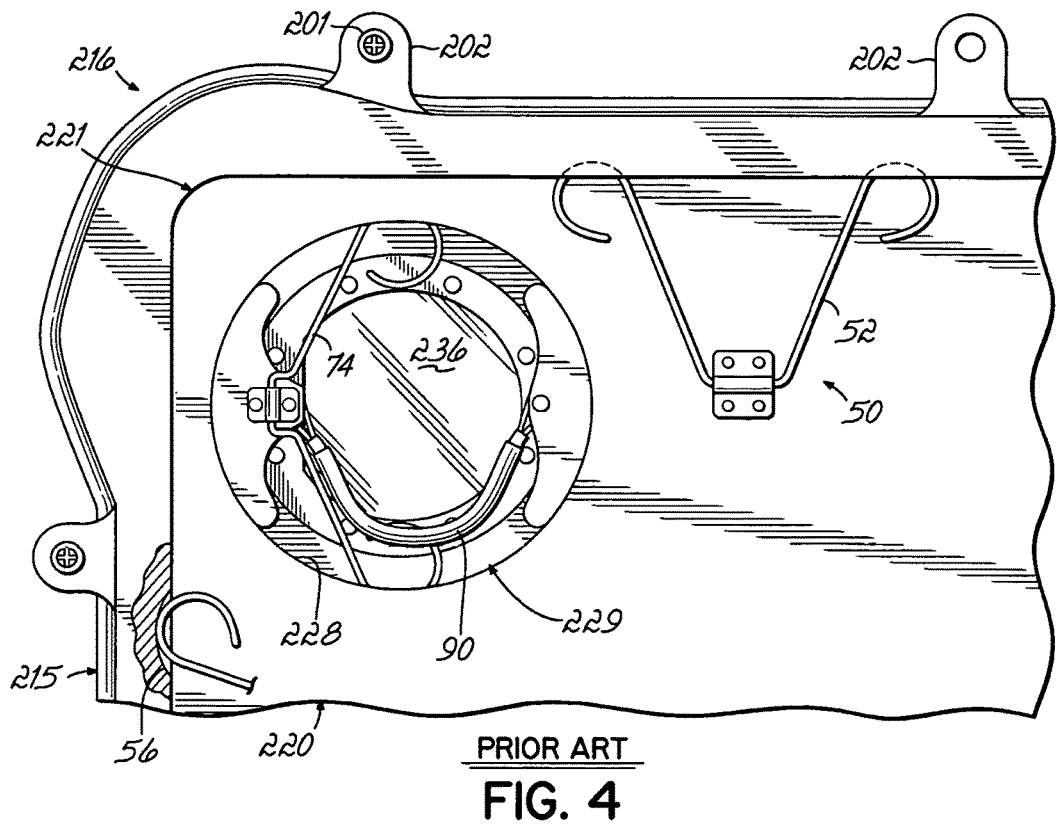

Thereafter, drip pan 220 is inserted into the frame 215 in the position illustrated in FIGS. 2 and 3, where o-ring 222 creates a peripheral seal between the drip pan 220 and the frame 215 and provides continuous sealing during air frame flexure and without the disadvantage of any face or sandwich-type seal in this regard. Resilient members 50 releasably secure the drip pan 220 to the frame 215 where elongated arm 52 with curved portions 54 selectively engage slots 56. Once the pan 220 is inserted into the frame 215, a drain line 224 may be connected to pass drainage fluids from drain 226.

As set forth above, and with continued reference to FIG. 2, the frame 215 accommodates the outward expansion of the flexible skirt 28 at corner 210. In particular, the corner structure 216 of frame 215 is expanded outwardly to match the outward expansion of the flexible skirt 28, as shown. In addition, the radius of the inwardly-facing frame corner represented at 242 has been significantly reduced to correspond to a relatively small radius of corner 221 of drip pan 220.

With reference to FIGS. 2 and 3, the frame 215 comprises four straight sides or rails 247a, 247b, 247c, 247d connected by curved portions 249a and 249b, the corner structure 216, and curved portion 249c, respectively. The rails 247a, 247b, 247c, 247d; the curved portions 249a, 249b, 249c; and the corner structure 216 collectively define the inwardly-facing peripheral surface 235 (shown in FIG. 2). Each rail 247a, 247b, 247c, 247d has a respective width indicated by $W_5$, $W_6$, $W_7$, $W_8$ (labeled in FIG. 3) measured from the inwardly-facing peripheral surface 235 to an outer periphery of the frame 215. A lip 254 projects beyond the inwardly-facing peripheral surface 235 to stop the pan 220 from being forced past the frame 215.

With reference to FIGS. 2-5, the width of the corner structure 216 varies to accommodate the expansion of the flexible skirt 28, specifically the curve 230, at corner 210. The variation in the width of the corner structure 216 is shown best in FIGS. 4 and 5 in which the width of the corner structure 216 transitions from the width $W_7$ of rail 247c to width $W_8$ of rail 247d. The width of the corner structure 216 at one location, for example, at width $W_9$ or width $W_{11}$, may be greater than either width $W_7$ or width $W_8$.

Figure 5:
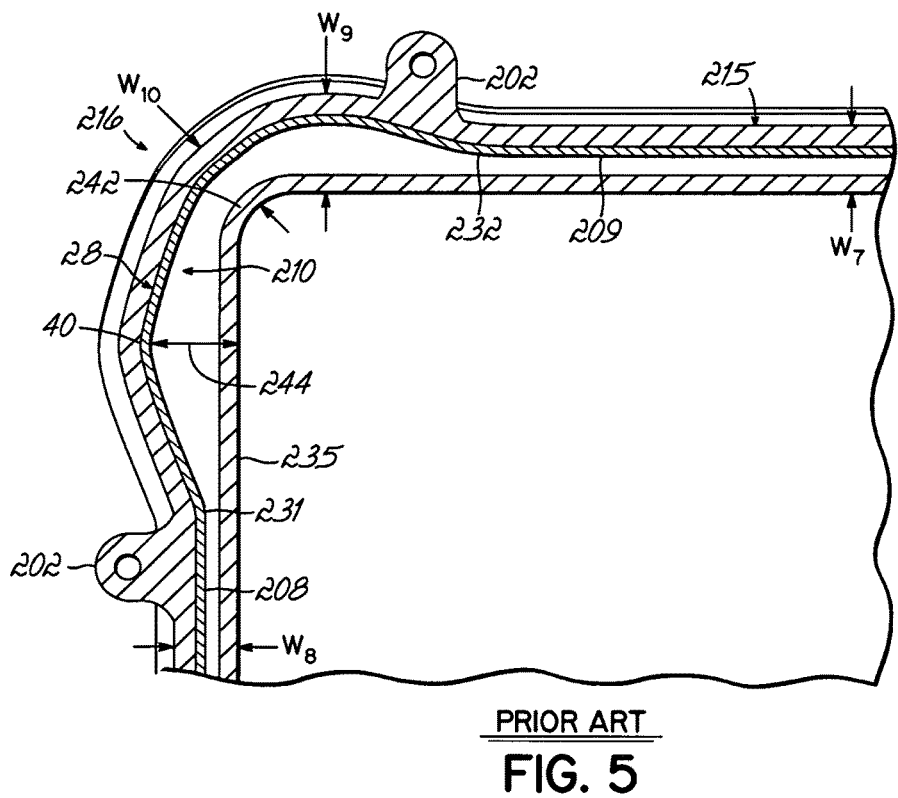

With reference to FIG. 5, the inwardly-facing peripheral surface 235 of the frame 215 is spaced inwardly of the depending portion 40 of the skirt 28. In this regard, in the cross-sectional plane shown in FIG. 5, the inwardly-facing peripheral surface 235 is spaced inwardly of the skirt 28. For example, the inwardly-facing peripheral surface 235 is spaced by a distance 244 as measured in the plane indicated in FIG. 5 from the innermost surface of the depending portion 40 of the skirt 28 perpendicular to the inwardly-facing peripheral surface 235. Accordingly, when the frame 215 is installed, the inwardly-facing peripheral surface 235 defines an opening that is smaller in all dimensions in the plane shown relative to the opening defined by the skirt 28.

With regard to the pan 220 and with further reference to FIG. 2, the pan 220 has an outwardly-facing peripheral surface 239, which has four straight sides 250a, 250b, 250c, 250d connected by corners 211, 212, 213, and corner 221. The outwardly-facing peripheral surface 239 conforms to the inwardly-facing peripheral surface 235. As set forth above, the radius of the corner 242 is significantly reduced to correspond to the radius of the corner 221 of the pan 220. As shown in FIGS. 2-5, the corner 221 is developed about a much smaller radius than its other pan corners 211, 212, and 213. It will be appreciated that the variation of the radius configuration of the corner 221 from the corners 211, 212, and 213 simplifies installation of the pan 220 by preventing incorrect installation since the pan 220 may be inserted into the frame 215 in only one orientation.

The installation and the removal of the drip pan 220 is accomplished quickly using the resilient members 50 because no tools such as screwdrivers or wrenches are required. The resilient members 50 are permanently secured to the drip pan 220 by brackets 58, so the resilient members 50 may not be lost or misplaced when the drip pan 220 is removed to gain full access to the engine 14 and rotor transmission 16.

Additionally, the drip pan 220 defines a plurality of access ports 223, 224, 225, and 226 and a filter access port 228, which is provided with a removable port cover 229 having a view window 236 and frame 237. Once the drip pan 220 is secured to the frame 215, the status of a filter or other component in or on the transmission may be viewed through the view window 236. Also, any one or more of the access covers 70 may be removed from its respective access port 223, 224, 225, and 226 such that routine maintenance and inspection of components within access opening 205 may be performed. To secure access cover 70 to the access opening 72 in drip pan 220, each access cover 70 has a resilient member 74. To facilitate the removal of access covers 70 from access openings 72, pull handles 90 are attached to access covers 70. Each access cover 70 is attached to the drip pan 220 by a suitable attachment device such as a cable or chain 82 so that when an inspection procedure is completed the access cover 70 is readily retrievable and positioned into access opening 72. The port 228 provides visual access to components on the transmission 16 (FIG. 1), such as the filter F, and any indicator or "bypass button" thereon, indicating the operational status thereof. In other words, the indicator or button can be viewed through filter access port 228.

In at least one application, as depicted in FIG. 1, an apparatus 32, such as a Fast-Rope Insertion and Extraction System (FRIES), may be installed to the ceiling of the cabin 12 below the transmission 16. Alternatively, carrousel bars (not shown in FIG. 1) may be added to the interior of the cabin 12 to support, for example, litters used for transporting patients in need of medical attention. In this case, at least one carrousel bar passes directly under the drip pan apparatus 200. To accommodate an apparatus 32, such as a carousel bar (shown in phantom in FIG. 3), elongated recesses 252 are provided in frame 215 so that the frame 215 does not interfere with the installation and operation of the carrousel bar 32.

Accordingly, the prior drip pan apparatus 200 seals the access opening 24 and substantially prevents fluids from the transmission 16 from entering the cabin 12 in the BLACK HAWK® "M" model helicopters. Thus, vital equipment and passengers in the cabin are protected from any fluid dripping from the transmission 16. In addition, the drip pan apparatus 200 permits quick access to the engine or transmission compartment of that helicopter, without requiring modification to the existing aircraft structure.

The new invention described below provides similar features and advantages in the BLACK HAWK® "M" Model helicopter, but, in addition, further accommodates different transmissions, such as those in the Australian Army's S70A-09 helicopter, on which the position of the filter is different, thus providing more direct filter access, while still providing the desirable seal functions noted above.

DETAILED DESCRIPTION

Embodiments of the invention described herein differ from the drip pan apparatus 200 described in U.S. Pat. No. 8,096,496 (the '496 patent) and shown in FIGS. 2-5. In other aspects, such as in materials of construction and function, embodiments of the present invention are similar to that described in the '496 patent and U.S. application Ser. No. 13/492,385. Accordingly, numerals found in FIGS. 2-5 designate like components to those in FIGS. 6A-13. Moreover, the helicopter 10 of FIG. 1 is similar in outward appearance to the BLACK HAWK® "M" Model helicopter and other helicopters manufactured by Sikorsky Aircraft Company of Stratford, Conn., including the Australian Army's S70A-09 helicopter, and for that reason is used herein to illustrate an overall helicopter environment in which the new drip pan apparatus 300 of FIGS. 6A-13 is used.

As described above, in FIG. 1, there is shown therein a helicopter 10 that has a cabin 12 and an engine or turbine 14 which powers a rotor transmission 16. A shaft 18 transmits rotary motion to a rotor 20 while the transmission 16 is also connected by a drive element (not shown) to tail rotor 22. The helicopter 10 has a transmission access opening 24.

Figure 6A:
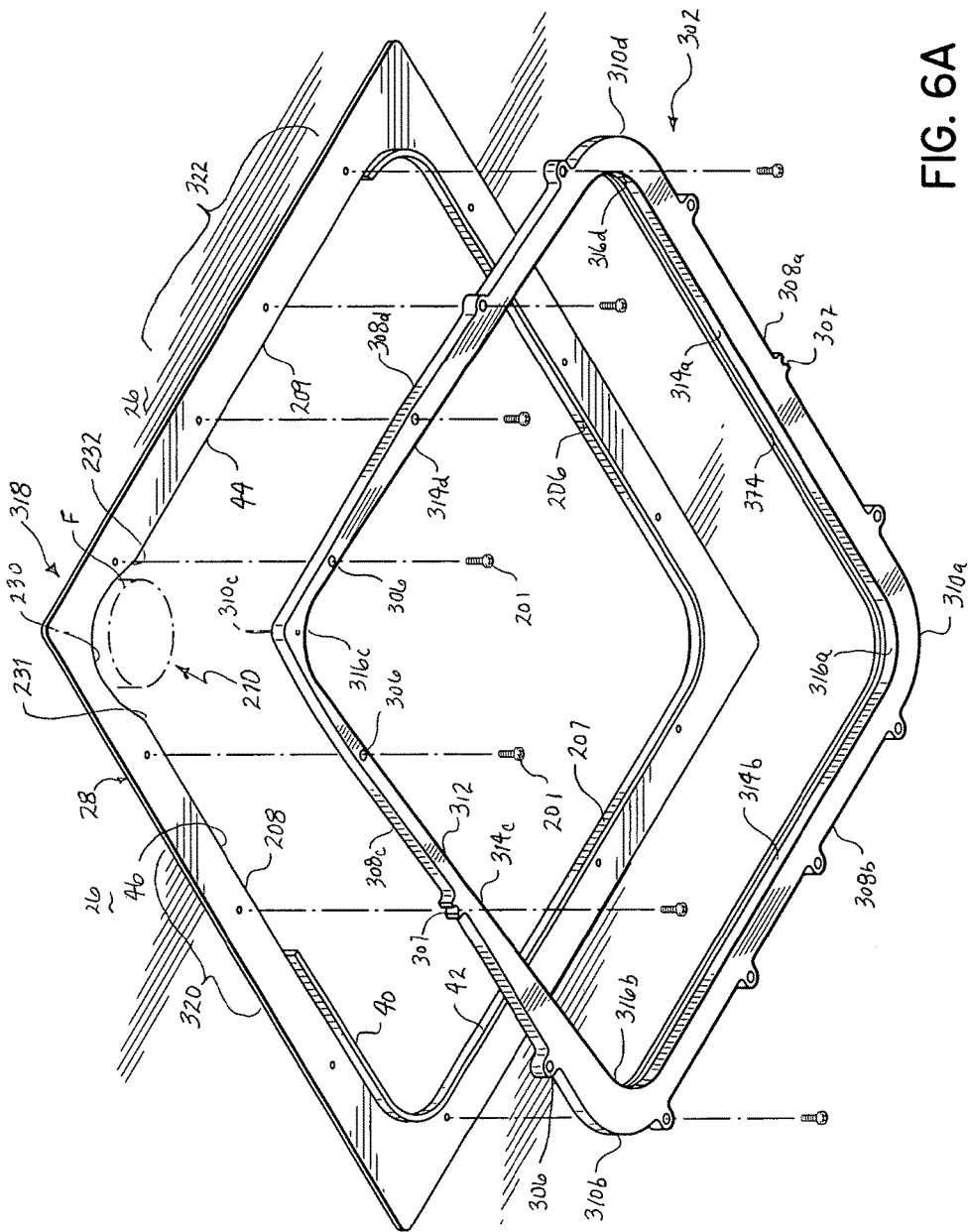
FIG. 6A is an exploded isometric view of components of the new drip pan apparatus and illustrates a modified skirt and a frame according to one embodiment of the invention.
Figure 6B:
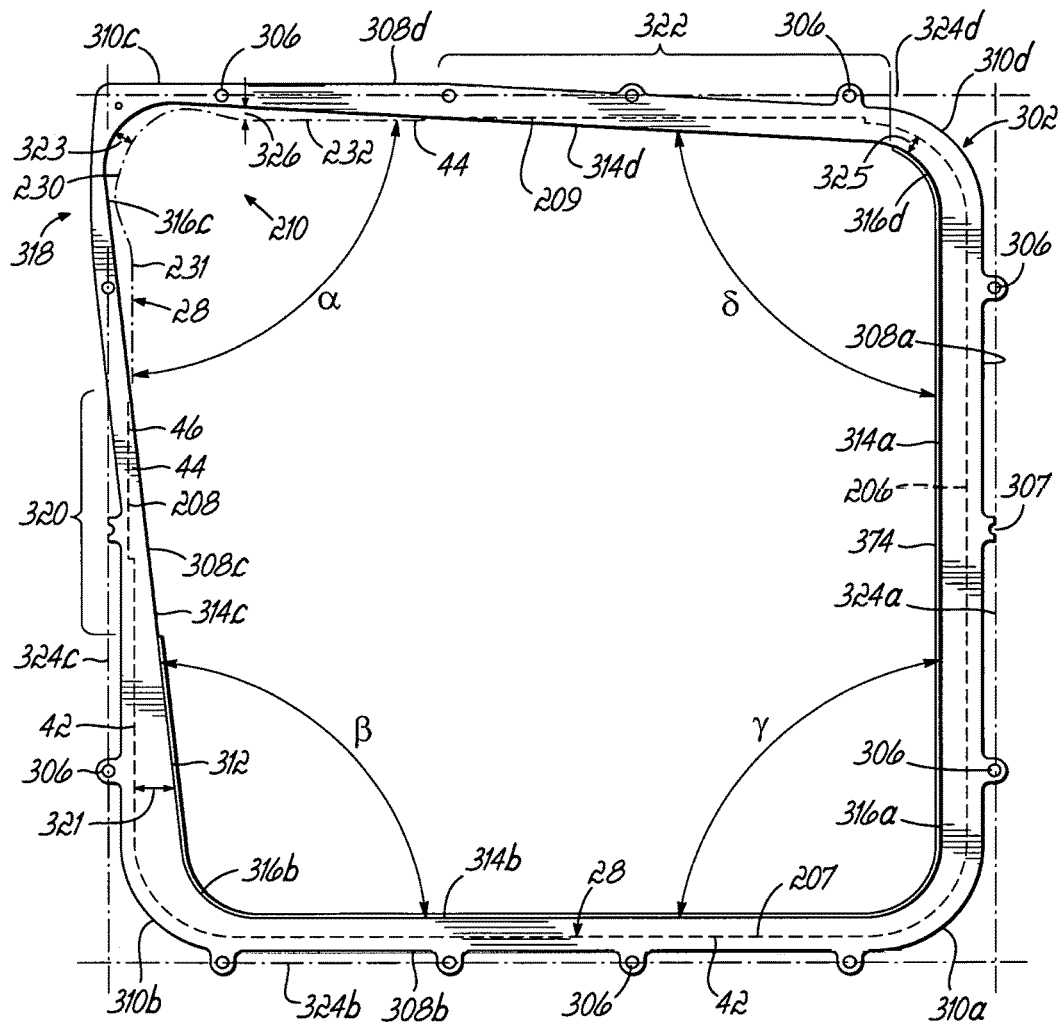
FIG. 6B is a plan view of the frame secured to the skirt of FIG. 6A.

Turning now to FIGS. 6A and 6B, the drip pan apparatus 300 has application for use in a BLACK HAWK® "M" Model helicopter and the S70A-09 Australian Army helicopter and similar air frames having the fixed transmission access opening 24 defined by an air frame 26 and a depending flexible skirt 28 attached thereto. The skirt 28 is many times more flexible than air frame 26 to which skirt 28 is attached. The skirt 28 has a generally J-shaped cross section with a depending portion 40 extending toward the cabin 12 and away from the transmission 16. The depending portion 40 of the skirt 28 of the helicopter 10 has straight portions 206, 207, 208, 209, and an expanded corner 210 between straight portions 208 and 209, as well as corners (not labeled). Furthermore, as is described below, in selected regions of the skirt 28, the depending portion 40 of the skirt 28 may be removed, via machining or other forming operation, or the skirt 28 may be otherwise formed without the depending portion 40. Accordingly, the skirt 28 may have one or more regions 42 in which the depending portion 40 extends toward the cabin 12 and one or more regions 44 without the depending portion 40.

Note that the skirt 28, between straight portions 208, 209, forms two inwardly-facing convex curves 231, 232 and an inwardly-facing concave curve 230. The concave curve 230 is oriented inwardly at the corner 210 so that straight portions 208, 209 flow into the curves 231, 232 which are tangent to, or flow into, curve 230. It will be appreciated that an extension of each straight portion 208, 209 would intersect an extension of curve 230 at an angle greater than zero degrees. This expanded corner 210 provides access to a filter F disposed on the transmission 16 that is accessible through the opening 24. Further in this regard, the corner 210 is asymmetric to the other corners (not labeled) of the skirt 28. In other words, the corner 210 is defined by a shape that is different than the other corners of the skirt 28. As is described below, the drip pan apparatus 300 sealingly cooperates with the skirt 28 to cover the access opening 24 to prevent fluid drippings from entering the cabin 12 of the helicopter 10.

Figure 7:
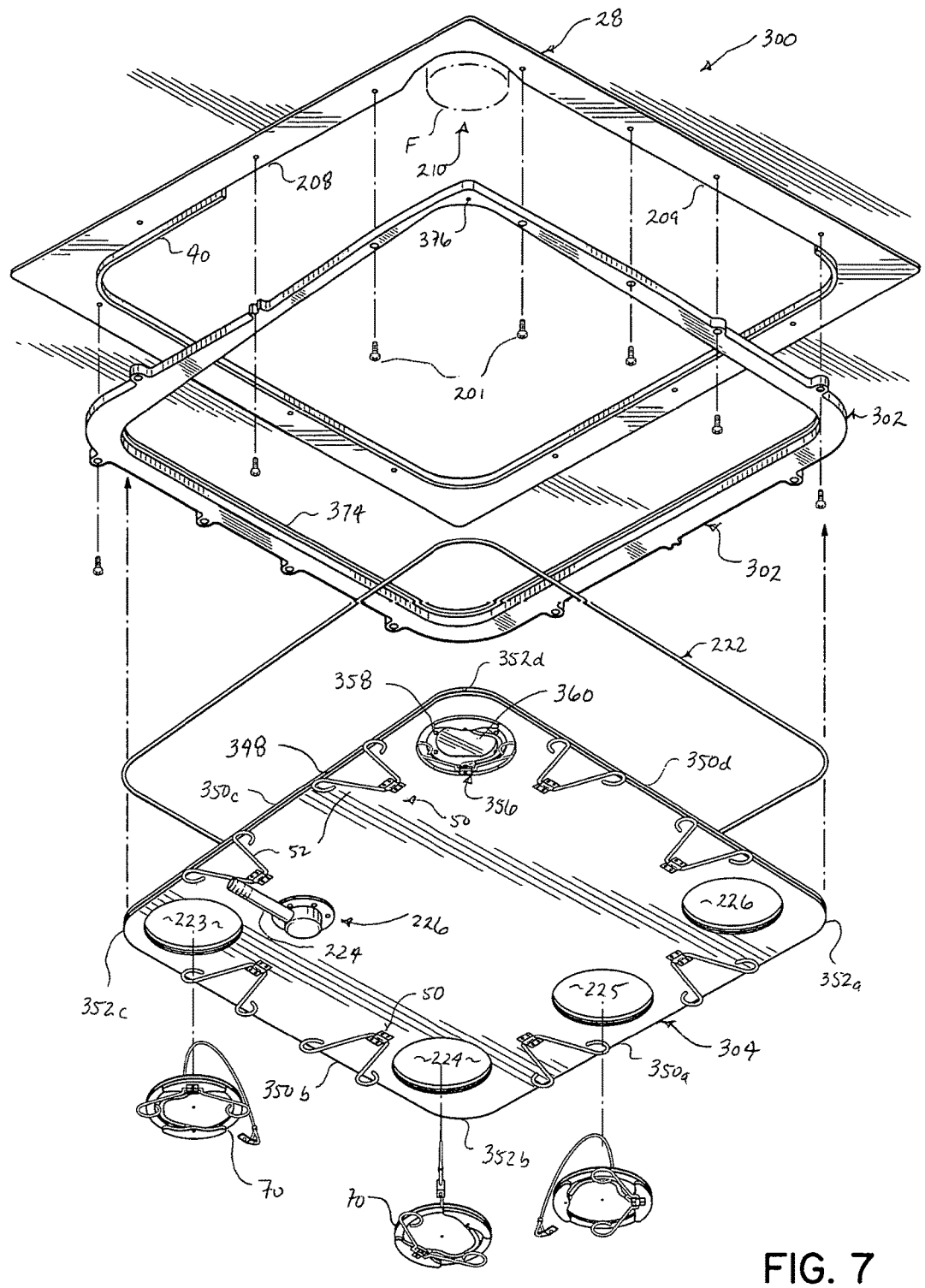
FIG. 7 is an exploded isometric view of a drip pan and a seal member according to one embodiment of the invention in relation to the frame and the skirt illustrated in FIG. 6A.

To that end, and with continued reference to FIGS. 6A and 7, in one embodiment, the drip pan apparatus 300 includes a frame 302 and a drip pan 304. As shown in FIG. 7, an o-ring seal 222 is disposed between the frame 302 and the drip pan 304 and provides a fluid-tight seal therebetween to prevent fluid leaking from the transmission 16 and the engine 12 from passing through the drip pan apparatus 300 and into the cabin 12.

In general, with reference to FIG. 6A, the frame 302 is secured to air frame 26 and cooperates with the skirt 28. As shown, rivets 201 or other fasteners may secure the frame 302 to the skirt 28 and the air frame 26 through a plurality of holes 306 or cutouts 307. A flexible sealing media (not shown), such as PROSEAL™ (manufactured by PRC Desoto International, Inc. of Indianapolis, Ind., a PPG Company) or other sealant may be dispensed between the frame 302 and the skirt 28 during the process of installing the frame 302 onto the air frame 26 and/or the skirt 28.

Figure 8:
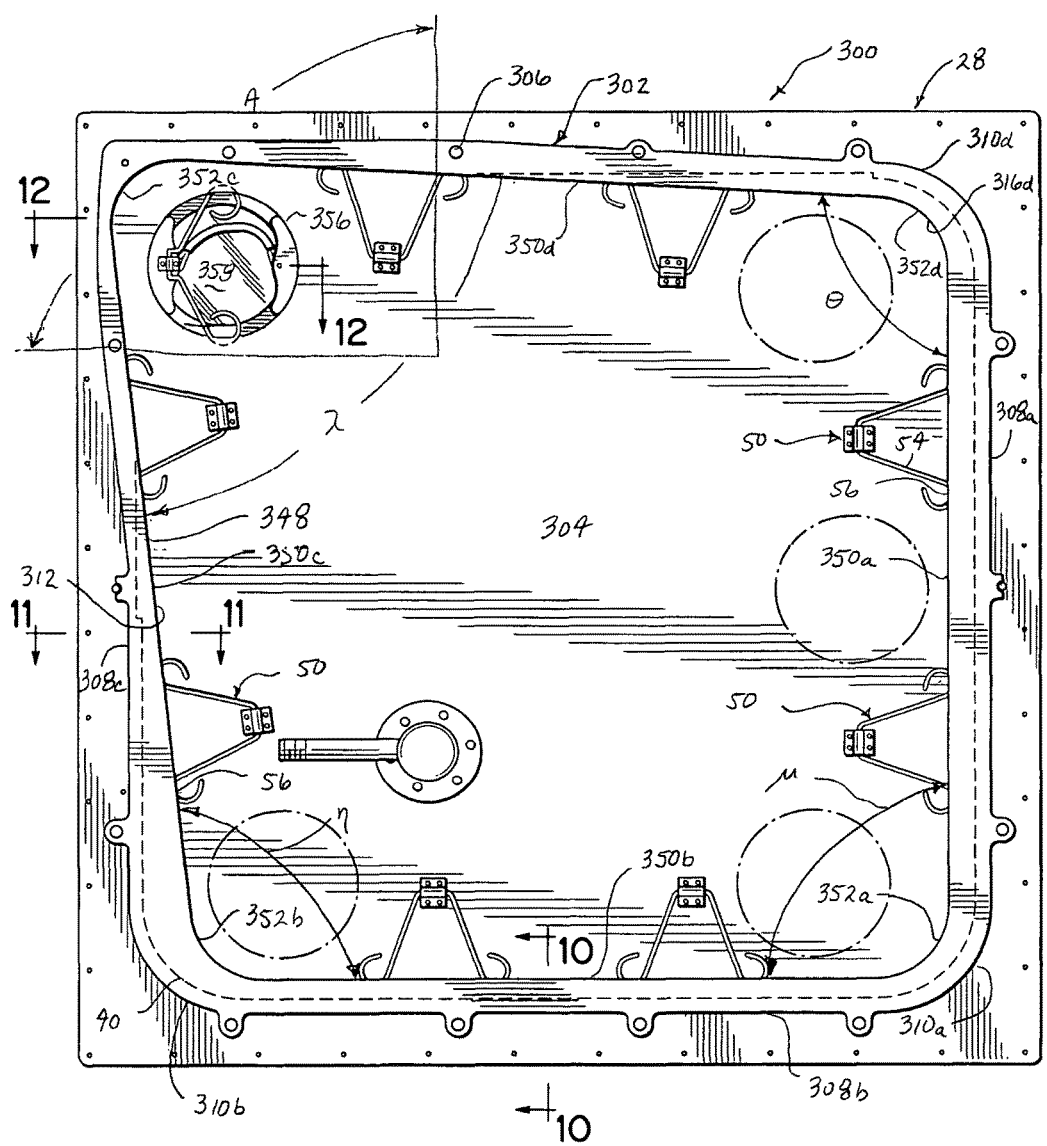
FIG. 8 is a plan view of the drip pan apparatus according to one embodiment following the insertion of the pan into the frame, as illustrated in FIG. 7, as will be viewed from the cabin section of a helicopter when in use.

Thereafter, the drip pan 304 is inserted into the frame 302 in the position illustrated in FIG. 8, where a seal member or o-ring 222 creates a peripheral seal between the frame 302 and the drip pan 304 and provides continuous sealing during air frame flexure and without the disadvantage of any face seal in this regard. The resilient members 50 releasably secure the drip pan 304 to the frame 302 similarly to the prior pan of the '496 patent where elongated arm 52 with curved portions 54 selectively engage slots 56.

More specifically, and with reference to FIGS. 6A and 6B, the frame 302 comprises four sides or rails 308a, 308b, 308c, and 308d connected by curved corner portions 310a, 310b, 310c, and 310d. The rails 308a, 308b, 308c, 308d and the curved portions 310a, 310b, 310c, and 310d, collectively define an inwardly-facing peripheral surface 312. In this regard, the inwardly-facing peripheral surface 312 includes inwardly-facing peripheral surfaces 314a, 314b, 314c, and 314d separated by curved inwardly-facing peripheral surfaces 316a, 316b, 316c, and 316d. In the embodiment shown, the inwardly-facing peripheral surfaces 314a, 314b, 314c, and 314d are generally straight and correspond to the rails 308a, 308b, 308c, 308d and the curved inwardly-facing peripheral surfaces 316a, 316b, 316c, and 316d generally correspond to the curved portions 310a, 310b, 310c, and 310d. Each of the rails 308a, 308b, 308c, and 308d has a constant width or variable width. For example, the rails 308a and 308b, as well as, the curved portions 310a and 310d have relatively constant widths. Whereas, the rails 308c and 308d and curved portions 310b and 310c vary in width as is described more fully below.

In addition, and with reference to FIGS. 6A and 6B, the arrangement and orientation of the rails 308a, 308b, 308c, 308d relative to one another defines a diamond-shaped configuration of the inwardly-facing peripheral surface 312. In one embodiment, this configuration accommodates the expansion of the skirt 28 at corner 210 and includes an enlargement in the area enclosed by the inwardly-facing peripheral surface 312 in a region 318 (FIG. 6B) that includes the corner 210. As is described in more detail below, the inwardly-facing peripheral surface 312 is spaced outwardly from an inner-most peripheral edge 46 (shown in phantom line in FIG. 6B) of the skirt 28 in the region 318.

To that end, as shown in FIG. 6B, the inwardly-facing peripheral surface 312 is spaced inwardly from the inner-most peripheral edge 46 of the skirt 28 along selected regions of the frame 302, crosses the inner-most peripheral edge 46 at selected regions, and is then spaced outwardly from the inner-most peripheral edge 46 along other selected regions of the frame 302. As the terms are used herein, "inwardly" means generally towards the center of the frame 302 and "outwardly" means generally away from the center of the frame 302. For example, the inwardly-facing peripheral surface 312 is generally positioned inwardly of the straight portion 208 of the skirt 28 near the curved portion 310b by an amount indicated at 321 in FIG. 6B. The surface 312 is thus generally closer to the center of the frame 304 than the inner-most peripheral edge 46 at this location. By way of further example, near the curved portion 310c, the inwardly-facing peripheral surface 312 is spaced outwardly of the skirt 28 by an amount indicated at 323, i.e., the orientation between the inwardly-facing peripheral surface 312 and the inner-most peripheral edge 46 is reversed from that illustrated at 321. The surface 312 is thus generally further from the center of the frame than the skirt 28 at 323. By way of further example, the inwardly-facing peripheral surface 312 may be spaced inwardly from the skirt 28 by an amount 325 near the curved portion 310d. The surface 312 is thus generally closer to the center of the frame than the inner-most peripheral edge 46 at 325.

With continued reference to FIG. 6B, the inwardly-facing peripheral surface 312 may cross the straight portion 208 of the inner-most peripheral edge 46 in a region 320 between the curved portion 310b and the curved portion 310c. The surface 312 may transition from a position inside of the inner-most peripheral edge 46 to a position outside of the inner-most peripheral edge 46 in the region 320.

In the region 318, the inwardly facing peripheral surface 312 is spaced outwardly from the corner 210 defined by the skirt 28. For example, the surface 316c is outside of or further away from the center of the frame 302 than the inner-most peripheral edge 46 of the skirt 28 is from the center of the frame 302.

Between the curved portion 310c and the curved portion 310d and along the rail 308d, the inwardly-facing peripheral surface 312 may cross the inner-most peripheral edge 46 of the skirt 28 in a region 322 along the straight portion 209. The surface 312 may transition from a position outside of the inner-most peripheral edge 46 of the skirt 28 to a position inside of the inner-most peripheral edge 46 of the skirt 28 in the region 322.

In view of the above, the relative spacing of the inwardly-facing peripheral surface 312 relative to the skirt 28 in the regions 318, 320, and 322 may represent an enlargement of the area enclosed by the inwardly-facing peripheral surface 312 in the regions 318, 320, and 322 as compared to the drip pan apparatus 200 of the '496 patent. In the prior drip pan apparatus 200, described above, the inwardly-facing peripheral surface 235 is positioned inwardly of the skirt 28 at all locations. Thus, the inwardly-facing peripheral surface 235 encloses an area that is smaller than the area enclosed by the skirt 28. In contrast, embodiments of the present invention are not so limited. The area enclosed by the inwardly-facing peripheral surface 312 may be smaller, the same as, or larger than the area enclosed by the skirt 28 with a relative enlargement in enclosed area at the corner 210. Advantageously, embodiments of the new drip pan apparatus 300 may provide an improved clearance (described below with reference to FIG. 9, for example) in the corner 210 of the skirt 28 because of the relative enlargement or increase in area of the drip pan 304 in the corner 210. Thus, embodiments of the present invention may facilitate installation and removal of a filter from the transmission 16 while sealing the access opening 24 against fluid leakage.

Further, it will be appreciated that while two regions 320 and 322 are shown, the embodiments of the present invention are not limited to having two regions in which the inwardly-facing peripheral surface 312 transitions from a generally inwardly-spaced position relative to the inner-most peripheral edge 46 of the skirt 28 to an outwardly-spaced position relative to the skirt 28. For example, there may be more regions at which the inwardly-facing peripheral surface 312 crosses the skirt 28. Alternatively, there may be no regions at which the inwardly-facing peripheral surface 312 crosses the skirt 28. That is, the inwardly-facing peripheral surface 312 may be spaced outside of the inner-most peripheral edge 46 of the skirt 28 at all locations along the frame 302.

With continued reference to FIGS. 6A, 6B, and 8, in one embodiment, the inwardly facing peripheral surface 312 has a diamond-shaped configuration, which may be generally asymmetrical. The inwardly-facing peripheral surface 312, while differing from the shape of the skirt 28 in this embodiment may also be further described with respect to the plurality of bolt holes 306 and/or cutouts 307.

In the representative embodiment shown, each of the rails 308a, 308b, 308c, and 308d includes one or more holes 306 and/or cutouts 307 by which the frame 302 is secured to the air frame 26 and/or the skirt 28. It will be appreciated that the holes 306 may align with corresponding holes (not shown) in the air frame 26 and/or the skirt 28. The holes 306 along any particular rail 308a, 308b, 308c, and 308d may lie on a straight line. For example, the holes 306 defined by side rail 308a may lie on a straight line 324a, the holes 306 defined by rail 308b may lie on a straight line 324b, the holes 306 defined by rail 308c may lie on a straight line 324c, and the holes 306 defined by rail 308d may lie on a straight line 324d. As shown, in the pairs of the straight lines 324a, 324b and 324b, 324c and 324c, 324d and 324d, 324a, the straight lines are substantially perpendicular to one another.

However, unlike the drip pan apparatus 200, described above, in one embodiment of the new drip pan apparatus 300, one or more of the inwardly-facing peripheral surfaces 314a, 314b, 314c, and 314d is not parallel with the corresponding straight line 324a, 324b, 324c, and 324d. In particular, in the embodiment shown, the inwardly-facing peripheral surface 314c is not parallel to the straight line 324c and the inwardly-facing peripheral surface 314d is not parallel to the straight line 324d. As noted above, this non-parallel relationship may generally result in the variation in width of the corresponding rail 308c and/or 308d. This nonparallel relationship may generally define the diamond shape of the inwardly-facing peripheral surface 312.

In this regard and with continued reference to FIG. 6B, in one embodiment, an acute angle, a, is formed between the inwardly-facing peripheral surfaces 314c and 314d. By way of example and not limitation, a may measure from about 75° to just less than 90° and, by way of further example, a may measure from about 80° to about 88°. The acute angle α may give the inwardly-facing peripheral surface 312 its characteristic diamond shape. Further in this regard, an obtuse angle β may be formed between inwardly-facing peripheral surfaces 314c and 314b. The obtuse angle β may measure from slightly (2 or 3 tenths of a degree) greater than 90° to about 100° and, by way of further example, β may measure from slightly greater than 91° to about 95°. Similarly, the opposing junction between the rail 308a and the rail 308d at the corner portion 310d may also be defined by an obtuse angle δ. For example, the obtuse angle δ is formed between inwardly-facing peripheral surfaces 314a and 314d and may measure from slightly greater than 90° to about 95° and, by way of further example, δ may measure from about 91° to about 95°. The inwardly facing peripheral surface 314a and the inwardly-facing peripheral surface 314b may define an angle γ therebetween. The angle γ may be an acute angle. However, in one embodiment, the angle γ may be a right angle. Accordingly, unlike the prior drip pan apparatus 200, embodiments of the drip pan apparatus 300 may include only a single right angle, for example, between the inwardly-facing peripheral surface 314a and the inwardly-facing peripheral surface 314b.

The above-identified angular relationships between the inwardly-facing peripheral surfaces 314a-314d generally provide the diamond-shaped configuration of the inwardly-facing peripheral surface 312. In one embodiment, the diamond-shaped configuration may be symmetrical about at least one plane. In this regard, the obtuse angle β may be approximately the same as the obtuse angle δ. And, where the dimensions of each of the rails 308c and 308d are the same and where the dimensions of each of the rails 308a and 308b are the same, the inwardly-facing peripheral surface 312 may be symmetrical about a plane that extends from the corner portion 310a to the corner portion 310c.

However, embodiments of the present invention need not be symmetrically shaped. That is, the inwardly-facing peripheral surface 312 may define a diamond-shaped configuration that is asymmetrical. This may be the case, for example, where the obtuse angle β is different from the obtuse angle δ. In this case, the rails 308a, 308b, 308c, and 308d will be of different lengths. For example, in the representative embodiment shown in FIG. 6B, the rail 308c or the rail 308d may be the longest and the rail 308a or the rail 308b may be the shortest.

Further in this regard, the inwardly-facing surfaces 314a, 314b, 314c, and 314d may be of different lengths. In one embodiment, the surfaces 314a, 314b, 314c, and 314d are straight, however, non-linear surfaces may be possible. The length of any single one of the rails 314a, 314b, 314c, and 314d may be determined by the distance between the intersections of a respective one of the inwardly-facing peripheral surface with a tangent to each adjacent curved portion. For example, where the curved inwardly-facing peripheral surface 316a is defined by a first radius and where the curved inwardly-facing peripheral surface 316b is defined by a second radius, the length of the inwardly-facing peripheral surface 314b, which in the representative embodiment is straight, may be determined by measuring the distance from the intersection of the surface 314b at a location which is tangent to the first radius of the curved surface 316b to the intersection of the surface 314b at a location which is tangent to the second radius of the curved inwardly-facing peripheral surface 316a. The lengths of each of the surfaces 314a, 314c, and 314d may be determined in a similar manner.

In view of this construction, it will be appreciated that the length of any single one of the surfaces 314a, 314b, 314c, and 314d is determined at least in part by the curvature of the corresponding inwardly-facing surfaces 316a, 316b, 316c, and 316d. In this regard, where one or more of the inwardly-facing surfaces 316a, 316b, 316c, and 316d is defined by a radius, the radius may range from about ½ inch to about 5 inches, and may depend upon the shape of the corresponding skirt 28. In one embodiment, the curved inwardly-facing peripheral surface 316c may be defined by a radius that is generally smaller than each of the other curved inwardly-facing peripheral surfaces 316a, 316b, and 316d. By way of example and not limitation, the curvature of the surface 316c may be in the range of at least about 5% less to about 20% less than any single one of the other surfaces 316a, 316b, 316c, and 316d. It will be appreciated, however, that the minimum curvature may be determined by the size of the filter, F, as shown in FIG. 6A.

As described above, the frame 302, once installed, receives the drip pan 304. With reference to FIGS. 7 and 8, the drip pan 304 has an outwardly-facing peripheral surface 348, which has four outwardly-facing peripheral sides 350a, 350b, 350c, 350d connected by corners 352a, 352b, 352c, and 352d. The outwardly-facing peripheral surface 348 conforms to the inwardly-facing peripheral surface 312. Generally, the drip pan 304 is sized to fit within the frame 302 with a small clearance between the surface 312 and the surface 348. By way of example only, this clearance may be from about 1/32 of an inch to about 1/8 of an inch.

Further in this regard, the side 350a corresponds to the surface 314a, the side 350b corresponds to the surface 314b, the side 350c corresponds to the surface 314c, and the side 350b corresponds to the surface 314d. As with the surfaces 314a, 314b, 314c, 314d, in one embodiment the sides 350a, 350b, 350c, 350d are straight. However, embodiments of the present invention are not limited to straight sides. Corners 352a, 352b, 352c, and 352d correspond to the curved inwardly-facing peripheral surfaces 316a, 316b, 316c, and 316d, respectively. The curvature of each of the corners 352a, 352b, 352c, and 352d cooperates with the curvature associated with each of the peripheral surfaces 316a, 316 b, 316c, and 316d. As with the frame 302, the curvatures of the corners 352a, 352b, 352c, and 352d may differ from one another. That is, no two corners 352a, 352b, 352c, and 352d may have the same curvature. In particular, the corner 352c may have a curvature that is dictated by the size of the filter, F, as is set out above with regard to the curved portion 310c.

As shown in FIGS. 7 and 8, the outwardly-facing peripheral surface 348 that is generally diamond-shaped and corresponds generally to the diamond shape of the frame 302 as described above. In this regard, the orientation of the side 350c relative to the side 350d defines an acute angle λ, which, in one embodiment, corresponds to the acute angle α (FIG. 6B) of the frame 302. By way of example and not limitation, λ may measure from about 75° to just less than 90° and, by way of further example, λ may measure from about 80° to about 88°. An obtuse angle η may be formed between sides 350b and 350c and, in one embodiment, may correspond to the angle β (FIG. 6B) of the frame 302. The obtuse angle η may measure from slightly (2 or 3 tenths of a degree) greater than 90° to about 100° and, by way of further example, η may measure from about 91° to about 95°. Similarly, the sides 350a and 350d may define an obtuse angle θ, which, in one embodiment, may correspond to angle δ (FIG. 6B) of the frame 302. For example, the obtuse angle θ may measure from slightly greater than 90° to about 95° and, by way of further example, θ may measure from about 91° to about 95°. The sides 350a and 350b may define an angle μ therebetween, which may correspond, in one embodiment, to the angle γ (FIG. 6B) of the frame 302. The angle μ may be an acute angle. However, in one embodiment, the angle μ is a right angle. Accordingly, unlike the prior drip pan apparatus 200, embodiments of the new drip pan apparatus 300 may include only a single right angle between the sides 350a and 350b.

In view of the above-identified angular relationships between the sides 350a-350d, in one embodiment, the outwardly-facing peripheral surface 348 has a diamond-shaped configuration matching the shape of the inwardly-facing peripheral surface 312. In one embodiment, the diamond-shaped configuration may be symmetrical about at least one plane. In this regard, the obtuse angle η may be approximately the same as the obtuse angle θ. And, where the dimensions of each of the sides 350c and 350d are the same and where the dimensions of each of the sides 350a and 350b are the same, the outwardly peripheral surface 348 may be symmetrical about a plane that extends from the corner 352a to the corner 352c. However, embodiments of the present invention need not have symmetrically shaped drip pans. That is, the outwardly-facing peripheral surface 348 may define a diamond-shaped configuration that is asymmetrical. This may be the case, for example, where the obtuse angle (I is different from the obtuse angle θ. In this case, the sides 350a, 350b, 350c, and 350d will be of different lengths. For example, in the representative embodiment shown in FIG. 8, the side 350c or the side 350d may be the longest and the side 350a or the side 350b may be the shortest. It will be appreciated that the asymmetric shape of the inwardly-facing peripheral surface 312 of the frame 302 in cooperation with the asymmetric shape of the outwardly-facing peripheral surface 348 of the drip pan 304 may simplify installation of the drip pan 304 by preventing improper installation, because the pan 304 may be inserted into the frame 302 in only one orientation.

Figure 13:
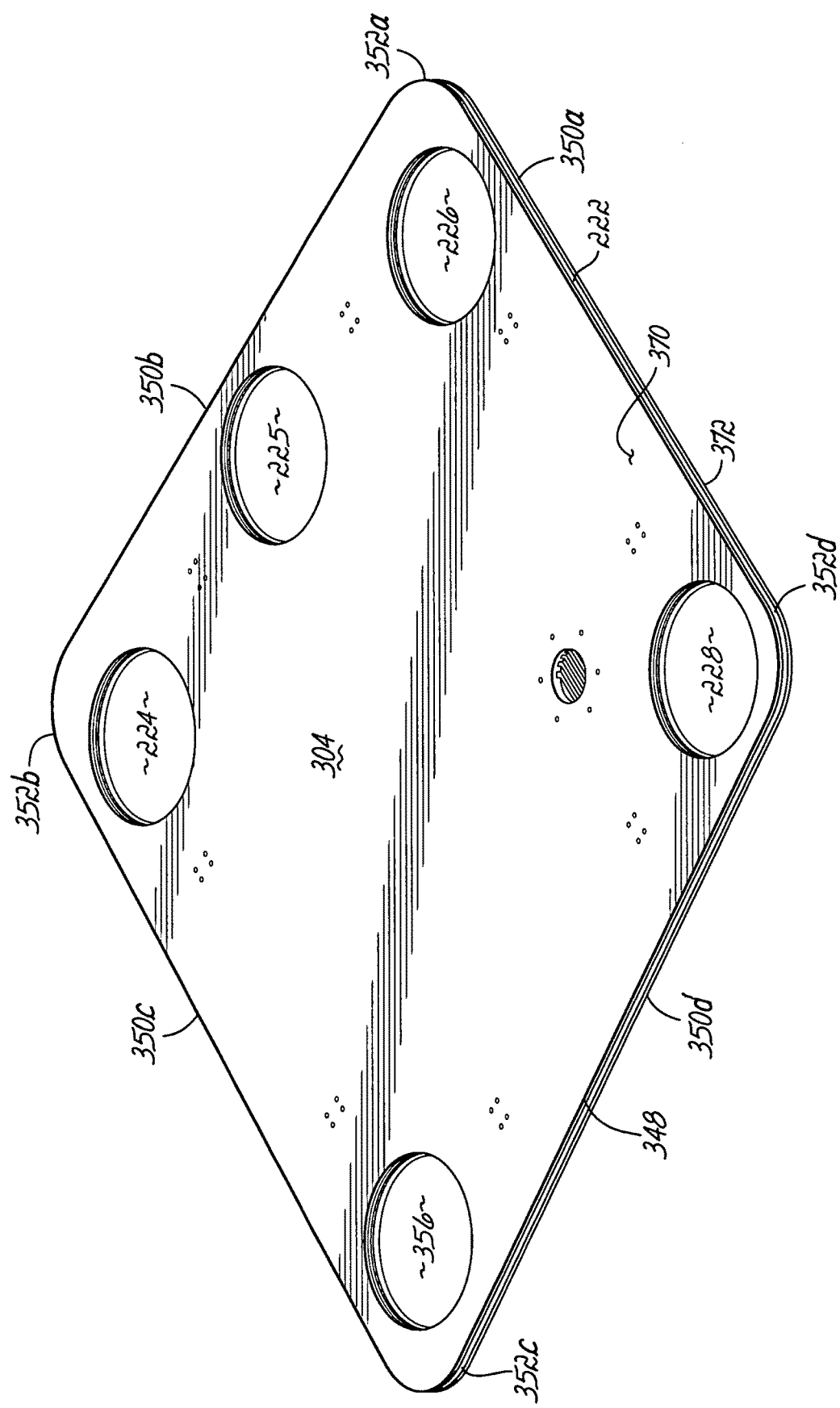
FIG. 13 is a perspective of the transmission side of the new drip pan when in use according to one embodiment of the invention.

In particular, with reference to FIG. 13, the drip pan 304 has a transmission-facing surface 370 and an opposing cabin-facing surface 372. The surfaces 370 and 372 generally define a substantially planar member. When properly installed, the transmission-facing surface 370 is oriented toward the transmission 16 and the cabin-facing surface 372 may form a portion of the ceiling of the cabin 12. While it may be possible to install the drip pan 304 into the frame 302 with the transmission-facing surface 370 oriented toward the cabin 12, such an installation is improper.

With reference to FIG. 7, while o-ring 222 is shown in a simple, outwardly facing, parallel sided groove, other groove shapes capturing the o-ring 222 to the drip pan 304 (or alternatively to the frame 304) may be used. It will also be appreciated that the scale of the figures, such as in FIGS. 10, 11, 12A and 12B may be changed, such that o-ring 222 is actually in more of an oval or circular cross-section, or more of a squared configuration than as shown in these figures.

Additionally, in one embodiment, the drip pan 304 defines a plurality of access ports 223-226 and a filter access port 356, which is provided with a removable port cover 358 having a view window 360 and a frame 362. Once the drip pan 304 is secured to the frame 302, the status of a filter F or other component in or on the transmission may be viewed through the view window 360. Also, any one or more of the access covers 70 may be removed from its respective access port 223-226 such that routine maintenance and inspection of components within access opening 24 may be performed.

Figure 9:
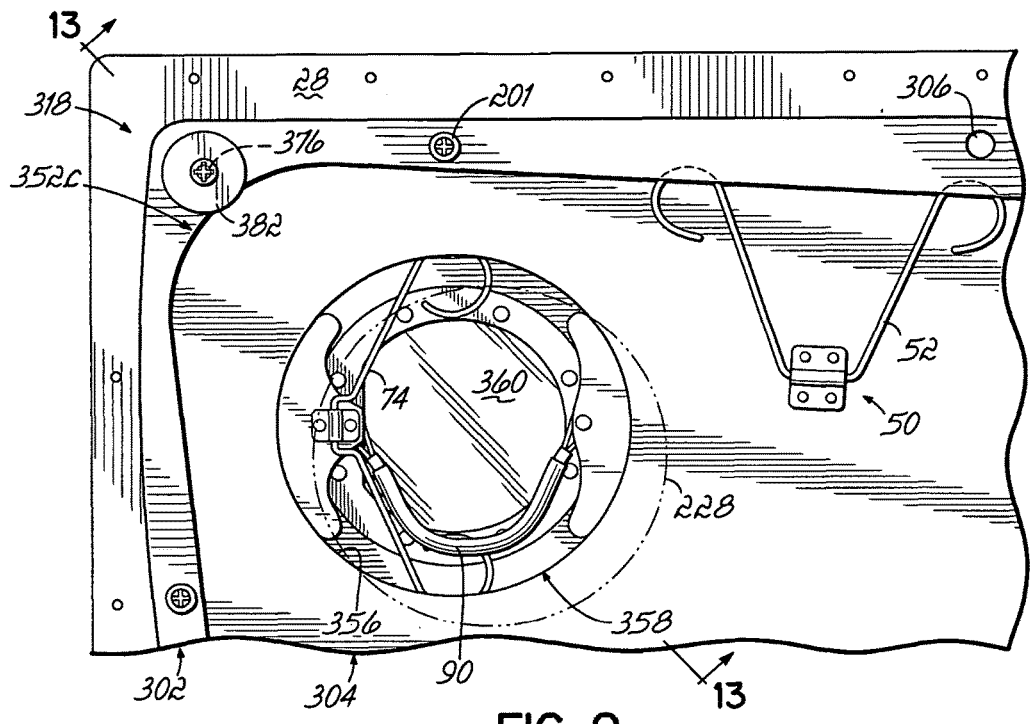
FIG. 9 is an enlarged view of the corner structure according to one embodiment of the invention in the upper left-hand corner of FIG. 8 to graphically illustrate a filter access port of one embodiment of the present invention contrasted with the prior art access port in phantom for comparison.
Figure 9A:
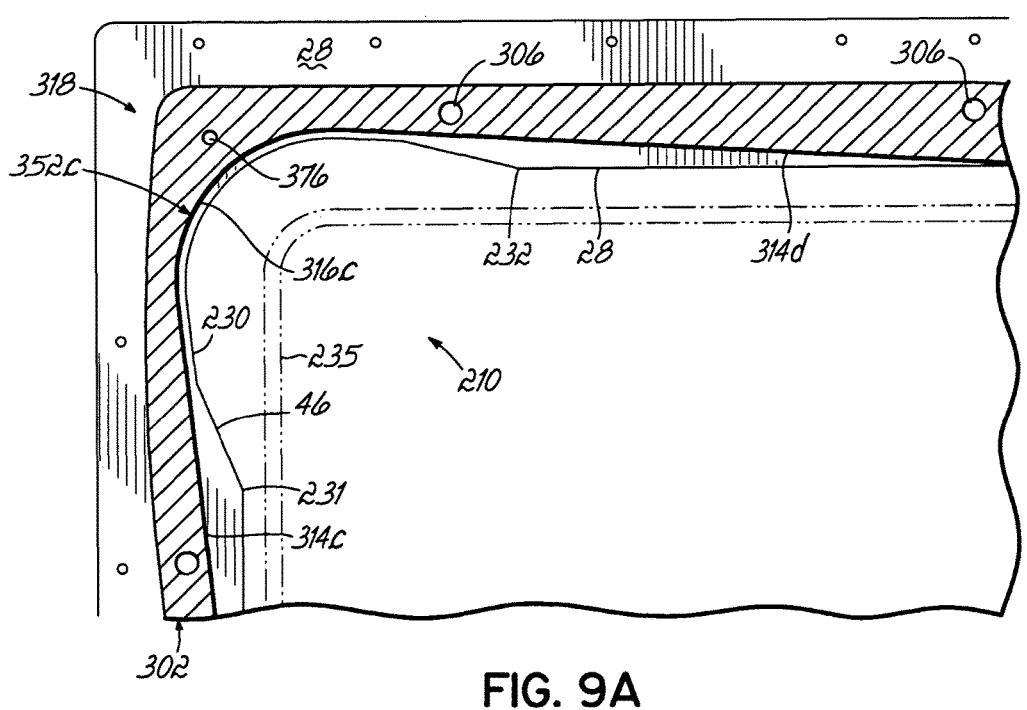
FIG. 9A is a cross-sectional view of the corner structure in FIG. 9, but illustrating the prior art inwardly-facing peripheral surface of the prior art frame in phantom for comparison.

FIGS. 9 and 9A illustrate area A of FIG. 8 in greater detail. As shown in FIGS. 9 and 9A, the outwardly spaced position of the inwardly-facing peripheral surface 312 in the region 318 allows the filter access port 356 to be moved out toward the corner structure 210 of the skirt 28 and more directly under (when in use) a filter compared to the prior art port 228 (shown in phantom line in FIG. 9). Thus positioned, the filter access port 356 provides improved visual access to components on the transmission, such as the filter, and any indicator or "bypass button" thereon, indicating the operational status thereof. In other words, the indicator or button can be more easily viewed through filter access port 356 from more widely varied viewing positions than in the prior drip pan configuration.

The position of the inwardly-facing peripheral surface 312 is shown best in FIG. 9A. In particular, the curved inwardly-facing peripheral surface 316c is shown relative to the inner-most peripheral edge 46 of the skirt 28 and relative to the prior art inwardly-facing surface 235 (shown in phantom line). As shown, the peripheral surface 316c is positioned so as to enlarge the area defined by the inwardly-facing peripheral surface 312 in the region 318. The peripheral surface 316c is spaced outwardly from the inner-most peripheral edge 46 of the skirt 28. The filter access port 356 may then be positioned more closely to the skirt 28 in more direct alignment with the filter F on the transmission 16 without impairing the structural integrity of the drip pan 304.

As described above, in one embodiment of the present invention, the skirt 28 may require modification so that the frame 302 cooperates with the skirt 28. In particular, the depending portion 40 of the skirt 28 may have to be removed in selected regions along the periphery of the skirt 28. Therefore, in some embodiments, the helicopter 10, particularly the skirt 28, is modified prior to the installation of the drip pan apparatus 300.

As shown in FIG. 6B, in one embodiment, the depending portion 40 of the skirt 28 is removed in regions 320 and 322. That is, the depending portion 40 of the skirt 29 is removed in selected regions in which the inwardly-facing peripheral surface 312 crosses skirt 28. Alternatively, the depending portion 40 may be removed along an entire section of the skirt 28. With reference to FIG. 6B, the depending portion 40 of the skirt 28 may be removed from the region 320 to the region 322. As such, according to embodiments of the present invention, the depending portion 40 may extend along the perimeter of the skirt 28 only in one or more regions 42. The skirt 28 may be formed without the depending portion 40 in one or more other regions 44.

More specifically, and with reference to FIG. 6B, regions 42 may include the curved portion 310d, the side rail 308a, the curved portion 310a, the rail 308b, and the curved portion 310*b*. In addition, portions of each of the rail 308*c* and the rail 308*d* may include regions 42. One or more regions 44 may include portions of each of the rails 308*c* and 308*d* and the curved portion 310*c*. As described in more detail below, in one embodiment of the invention, the frame 302 may be configured to cooperate with each of the regions 42 and 44.

Figure 10:
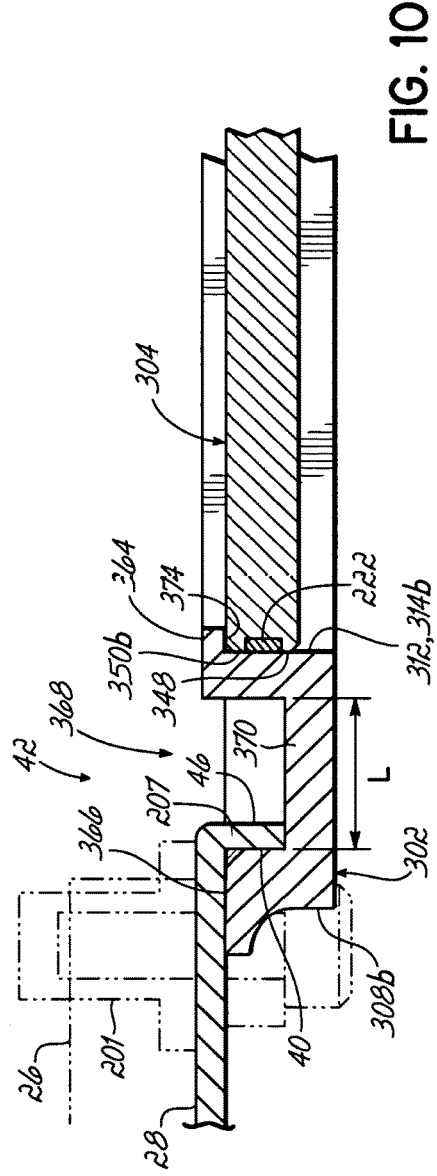
FIG. 10 is a cross-sectional view taken along section line 10-10 of FIG. 8.

With reference now to FIGS. 6B, 8, and 10, in regions 42, particularly along the rails 308*a*, the curved portion 310*a*, the rail 308*b*, and the curved portion 310*b*, the frame 302 may have a similar configuration as the prior art drip pan apparatus 200. For example, and with reference to FIGS. 6B and 10, the frame 302 may include an inner rim 364 spaced apart from an outer rim 366 and forming a trough 368 having a floor at 370 therebetween. The trough 368 cooperates with the depending portion 40 of the skirt 28. The trough 368 may have a relatively constant dimension "L" along the rail 308*a*, and 308*b*, for example.

Figure 11:
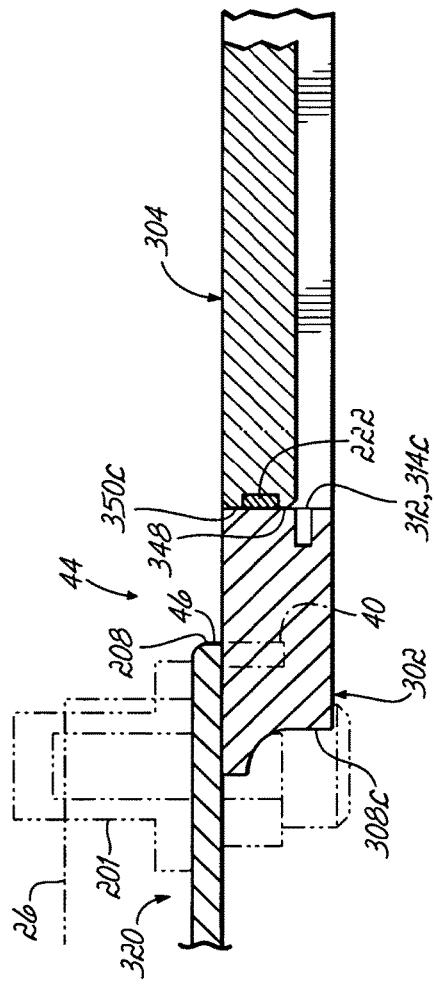
FIG. 11 is a cross-sectional view taken along section line 11-11 of FIG. 8.

In the region 320 and with reference to FIGS. 6B, 8, and 11, the depending portion 40 of the skirt 28 is removed (removed portion shown in phantom line) in region 320. The inwardly-facing peripheral surface 314*c* may be positioned inwardly from a peripheral edge 46 of the skirt 28. The peripheral edge 46 defines the innermost edge of the skirt 28 at the location shown. The frame 3002 may extend inwardly past the peripheral edge 46 and sealingly engage the drip pan 304 at this location.

Figure 12A:
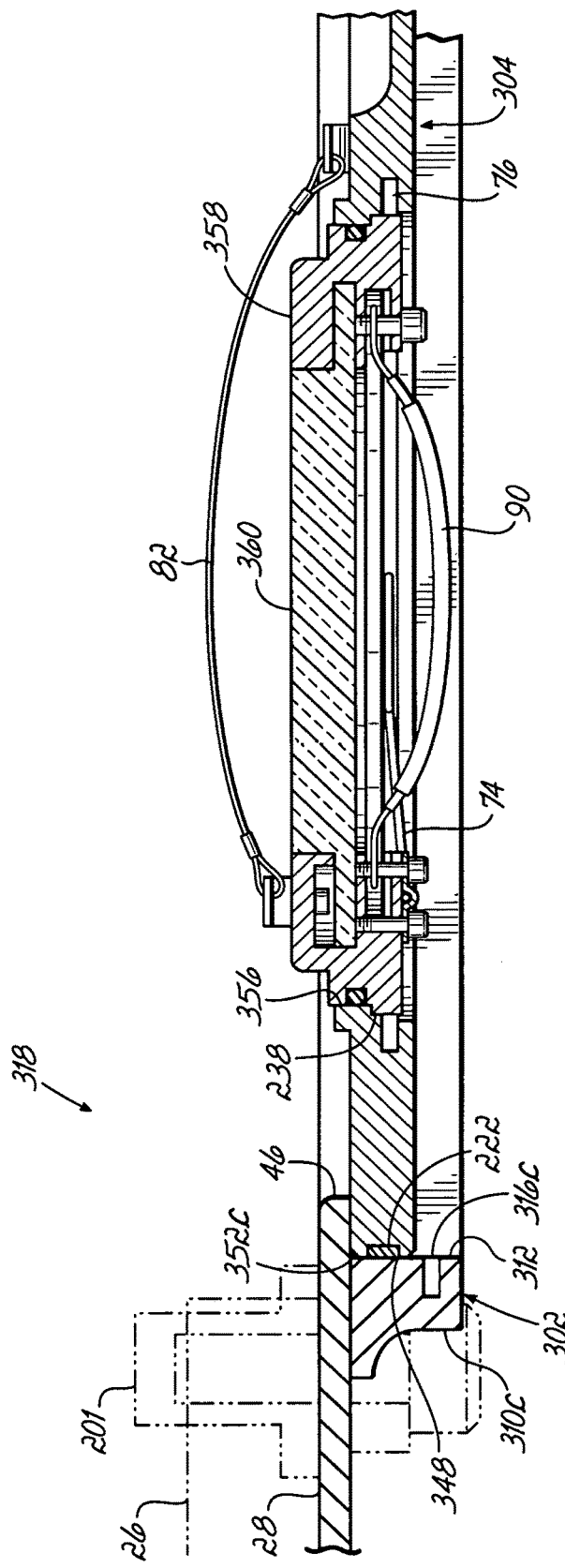
FIG. 12A is a cross-sectional view taken along section line 12-12 of FIG. 8 illustrating the filter access port according to one embodiment of the invention.
Figure 12B:
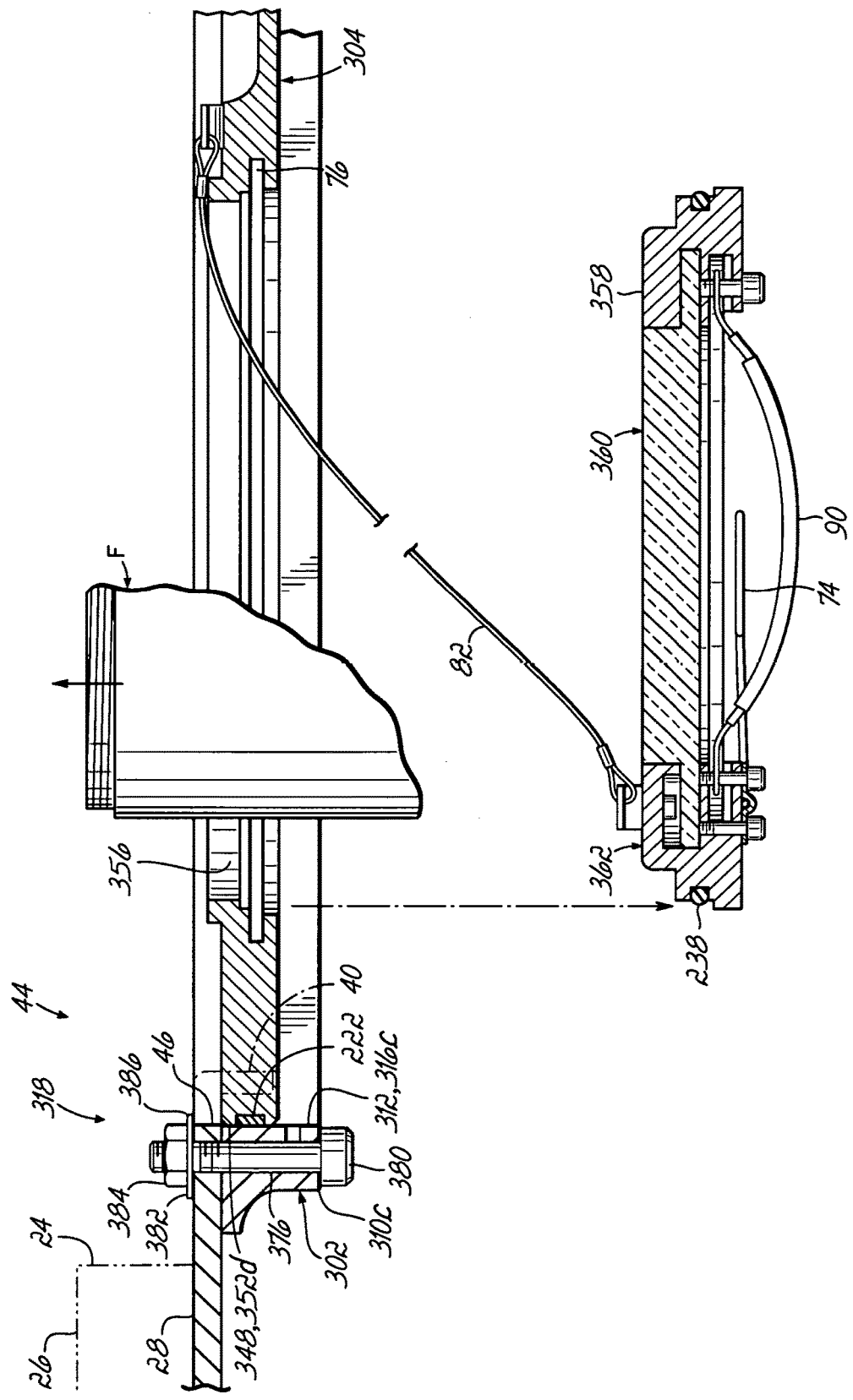
FIG. 12B is an exploded cross-sectional view taken along section line 13-13 of FIG. 9 and showing the filter access port cover removed and illustrating the replacement of a filter through the port.

With reference now to FIGS. 6B, 8, 12A, and 12B, in the region 318, particularly near the curved portion 310*c*, the depending portion 40 may be removed. The inwardly-facing peripheral surface 316*c* is spaced outwardly from the peripheral edge 46 of the skirt 28 at this location. Accordingly, the corner 352*c* of the drip pan 304 extends outwardly past the peripheral edge 46 to sealingly engage the surface 316*c*. As described above, the extension or enlargement of the drip pan 302 into the curved portion 310*c* in the region of the corner 210 allows the filter access port 356 to be moved toward the skirt 40 without any degradation of the structural integrity of the drip pan 302. Although FIGS. 12A and 12B depict the depending portion 40 removed, it will be appreciated that removal of the depending portion 40 in the region 318 may not be necessary. In this regard, the dimensions of the frame 302, particularly the height of the inwardly-facing peripheral surface 312, may be sufficient to accommodate the outwardly-facing peripheral surface 348 of the drip pan 304. Installation of the drip pan 304 into the frame 302 may allow the seal member 222 to engage the inwardly facing peripheral surface 312 before the drip pan 302 contacts the depending portion 40 of the skirt 28.

With reference to FIGS. 6A and 6B, in one embodiment of the present invention, the frame 302 includes a lip 374 that extends generally inwardly from the inwardly-facing peripheral surface 312 and is configured to act as a stop during installation of the drip pan 304 into the frame 302. The lip 374 may extend from the inner rim 364 as is shown in FIG. 10. In this regard, the lip 374 may extend circumferentially around the frame 304 or may extend only along portions of the frame 304.

In embodiments in which the lip 374 extends along limited portions of the inwardly-facing peripheral surface 312, the lip 374 may be coextensive with the one or more regions 42 (in which the skirt 28 includes the depending portion 40). Note that there may be no lip in the one or more regions 44 (i.e., portions of the pan 302 proximate the regions 44 lack the lip 374). As set forth above, the depending portion 40 may, in some regions, such as, in the transition regions 320 and 322, interfere with installation of the frame 302. In these regions, if the skirt 28 includes a depending portion, it is removed. In other regions, such as in region 318, the depending portion 40 may also be removed when it interferes with the installation of the drip pan 304. The presence or absence of the lip 374 in these regions is best illustrated by comparison of FIGS. 10 and 11.

In particular, in FIG. 10, the frame 302 cooperates with the depending portion 40 of the skirt 28, via the trough 368. The inner rim 364 includes the lip 374, and, by way of example only, the height of the lip 374 being about the thickness of the skirt 28. In one embodiment, the height of the inner rim 364 is greater than the height of the outer rim 368 by virtue of the lip 374.

In FIG. 11, the frame 302 extends inwardly past the skirt 28. The offset in height in the frame 302 that is associated with the lip 374, as shown in FIG. 10, does not exist at this location. As shown in FIG. 11, the height of the frame 302 is thus uniform across the cross section shown. In FIG. 10, the height of the inner rim 364 is greater than the height of the outer rim 368 which creates an offset between the inner rim 364 and the outer rim 366. In regions without the lip 374, it is unexpectedly observed that there are minimal issues with insertion of the pan 304 into the frame 302.

Alternatively, and with reference to FIG. 12B, the frame 302 may include a through-bore 376 that is configured to receive a fastener 380, such as a threaded bolt. In situations in which the skirt 28 is modified such that the peripheral edge 46 does not extend beyond the inwardly-facing peripheral surface 312, the fastener 380 may be inserted in the through-bore 376 through a stop 382, such as a washer, into cooperation with a nut 384. The stop 382 may extend beyond the peripheral edge 46 and provide a stop for the drip pan 304. Thus, a stop 386 may be added to the frame 304 subsequent to the installation of the frame 304 on the skirt 28 but prior to the insertion of the drip pan 304. The stop 386 may cooperate with the lip 374 on other portions of the frame 302 to prevent improper installation of the drip pan 304 into the frame 302.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details and drawings shown and described. Accordingly, departures may be made from such details without departing from the scope of the general inventive concept.

What is claimed is:

1. A method of installing a drip pan apparatus to a helicopter having a rotor transmission and a depending skirt that defines a rotor transmission access opening, the drip pan apparatus comprises a frame having an inwardly-facing peripheral surface and a slot, a drip pan having an outwardly-facing peripheral surface; a resilient member attached to the drip pan and adapted to cooperate with the slot; and a seal member configured to be disposed between the inwardly-facing peripheral surface and the outwardly-facing peripheral surface, the method comprising:

modifying at least a portion of the skirt;

securing the frame to one or both of the modified skirt and the helicopter structure whereby at least a portion of the inwardly-facing peripheral surface is spaced outwardly from the modified skirt;

inserting the drip pan into the frame such that the seal member sealingly engages the inwardly-facing peripheral surface and the outwardly-facing peripheral surface against fluid leakage therethrough; and engaging the slot with the resilient member to detachably secure the drip pan in sealing engagement with the frame.

2. The method of claim 1 wherein modifying the skirt includes removing a depending portion of the skirt.

3. A drip pan for cooperation with a frame secured to a depending skirt on a helicopter, an oil filter being attached to a rotor transmission, the frame having an inwardly-facing peripheral surface, said drip pan comprising:

a substantially planar member defining an access port and having an outwardly-facing peripheral surface, said access port for permitting access to the oil filter, and said outwardly-facing peripheral surface defining a plurality of sides, including a first side, a second side, a third side, and a fourth side and being configured to cooperate with the inwardly-facing peripheral surface of the frame, wherein a first angle is formed between said first side and said second side, said first angle being an acute angle, a second angle is formed between said second side and said third side, said second angle being an obtuse angle, and a third angle is formed between said third side and said fourth side of said plurality of sides, said third angle being a right angle, said substantially planar member being adapted to be removably received within the frame in a single orientation.

4. The drip pan of claim 3 wherein a fourth angle is formed between said first side and said fourth side of said plurality of sides, said fourth angle being an obtuse angle.

5. The drip pan of claim 3 wherein said plurality of sides are straight sides.

6. A method of installing a drip pan apparatus to a helicopter having a cabin, a rotor transmission, and a depending skirt with a generally J-shaped cross section having a depending portion that extends toward the cabin and that defines a rotor transmission access opening, the drip pan apparatus comprises a frame having an inwardly-facing peripheral surface and a slot, a drip pan having an outwardly-facing peripheral surface; a resilient member attached to the drip pan and adapted to cooperate with the slot; and a seal member configured to be disposed between the inwardly-facing peripheral surface and the outwardly-facing peripheral surface, the method comprising:

removing a selected region of the depending portion of the skirt, the selected region including a corner;

securing the frame to one or both of the modified skirt and the helicopter structure whereby at least a portion of the inwardly-facing peripheral surface is spaced outwardly from the modified skirt;

inserting the drip pan into the frame such that the seal member sealingly engages the inwardly-facing peripheral surface and the outwardly-facing peripheral surface against fluid leakage therethrough; and engaging the slot with the resilient member to detachably secure the drip pan in sealing engagement with the frame.

7. The method of claim 6 wherein modifying the skirt includes machining the selected region of the depending portion of the skirt while leaving another region of the depending portion of the skirt.

8. A drip pan for cooperation with a frame secured to a depending skirt on a helicopter, an oil filter being attached to a rotor transmission, the frame having an inwardly-facing peripheral surface, said drip pan comprising:

a substantially planar member defining an access port and having an outwardly-facing peripheral surface, said access port for permitting access to the oil filter, and said outwardly-facing peripheral surface defining a plurality of sides, including a first side and a second side, and being configured to cooperate with the inwardly-facing peripheral surface of the frame, wherein a first angle is formed between said first side and said second side, said first angle being an acute angle, and neither of said first side and said second side is parallel to another side of said plurality of sides.

9. The drip pan of claim 8 wherein said plurality of sides are straight sides.

* * * * *